United States Patent
Filippov et al.

(10) Patent No.: US 7,600,593 B2
(45) Date of Patent: Oct. 13, 2009

(54) ROBOTIC VEHICLE WITH DYNAMIC RANGE ACTUATORS

(75) Inventors: Mikhail Filippov, Arlington, MA (US); John P. O'Brien, Newton, MA (US); Adam P. Couture, Allston, MA (US)

(73) Assignee: iRobot Corporation, Bedford, MA (US)

( * ) Notice: Subject to any disclaimer, the term of this patent is extended or adjusted under 35 U.S.C. 154(b) by 175 days.

(21) Appl. No.: 11/762,458

(22) Filed: Jun. 13, 2007

(65) Prior Publication Data

US 2008/0196946 A1 Aug. 21, 2008

Related U.S. Application Data

(60) Provisional application No. 60/878,877, filed on Jan. 5, 2007, provisional application No. 60/908,782, filed on Mar. 29, 2007.

(51) Int. Cl.
*B62D 55/00* (2006.01)
(52) U.S. Cl. .................. 180/9.1; 180/9.32; 180/9.4; 180/65.8; 180/9.62; 901/1; 701/22; 305/127; 305/199; 305/12; 305/126; 305/165
(58) Field of Classification Search .................. 180/9.1, 180/9.32, 9.4, 65.8, 9.62; 901/1; 701/22; 305/127, 199, 12, 126, 165, 195
See application file for complete search history.

(56) References Cited

U.S. PATENT DOCUMENTS

| | | | | |
|---|---|---|---|---|
| 2,321,874 A | * | 6/1943 | Tandler et al. | 180/6.7 |
| 4,709,773 A | * | 12/1987 | Clement et al. | 180/9.32 |
| 5,022,812 A | * | 6/1991 | Coughlan et al. | 414/729 |
| 5,465,525 A | * | 11/1995 | Mifune et al. | 43/132.1 |
| 5,884,718 A | * | 3/1999 | Yamashiro et al. | 180/9.32 |
| 6,263,989 B1 | * | 7/2001 | Won | 180/9.32 |
| 7,348,747 B1 | * | 3/2008 | Theobold et al. | 318/568.21 |
| 2002/0189871 A1 | * | 12/2002 | Won | 180/9.32 |
| 2004/0216932 A1 | * | 11/2004 | Giovanetti et al. | 180/9.1 |
| 2007/0267230 A1 | * | 11/2007 | Won | 180/9.1 |
| 2008/0009968 A1 | * | 1/2008 | Bruemmer et al. | 700/245 |
| 2008/0179115 A1 | * | 7/2008 | Ohm et al. | 180/9.21 |

* cited by examiner

*Primary Examiner*—S. Joseph Morano
*Assistant Examiner*—Marlon A Arce
(74) *Attorney, Agent, or Firm*—Fish & Richardson P.C.

(57) ABSTRACT

A robotic vehicle including a chassis having front and rear ends, an electric power source supported by the chassis, and multiple drive assemblies supporting the chassis. Each drive assembly including a track trained about a corresponding drive wheel and a drive control module. The drive control module including a drive control housing, a drive motor carried by the drive control housing and operable to drive the track, and a drive motor controller in communication with the drive motor. The drive motor controller including a signal processor and an amplifier commutator in communication with the drive motor and the signal processor and is capable of delivering both amplified and reduced power to the drive motor from the power source. In one instance, the drive control module is separately and independently removable from a receptacle of the chassis as a complete unit.

32 Claims, 23 Drawing Sheets

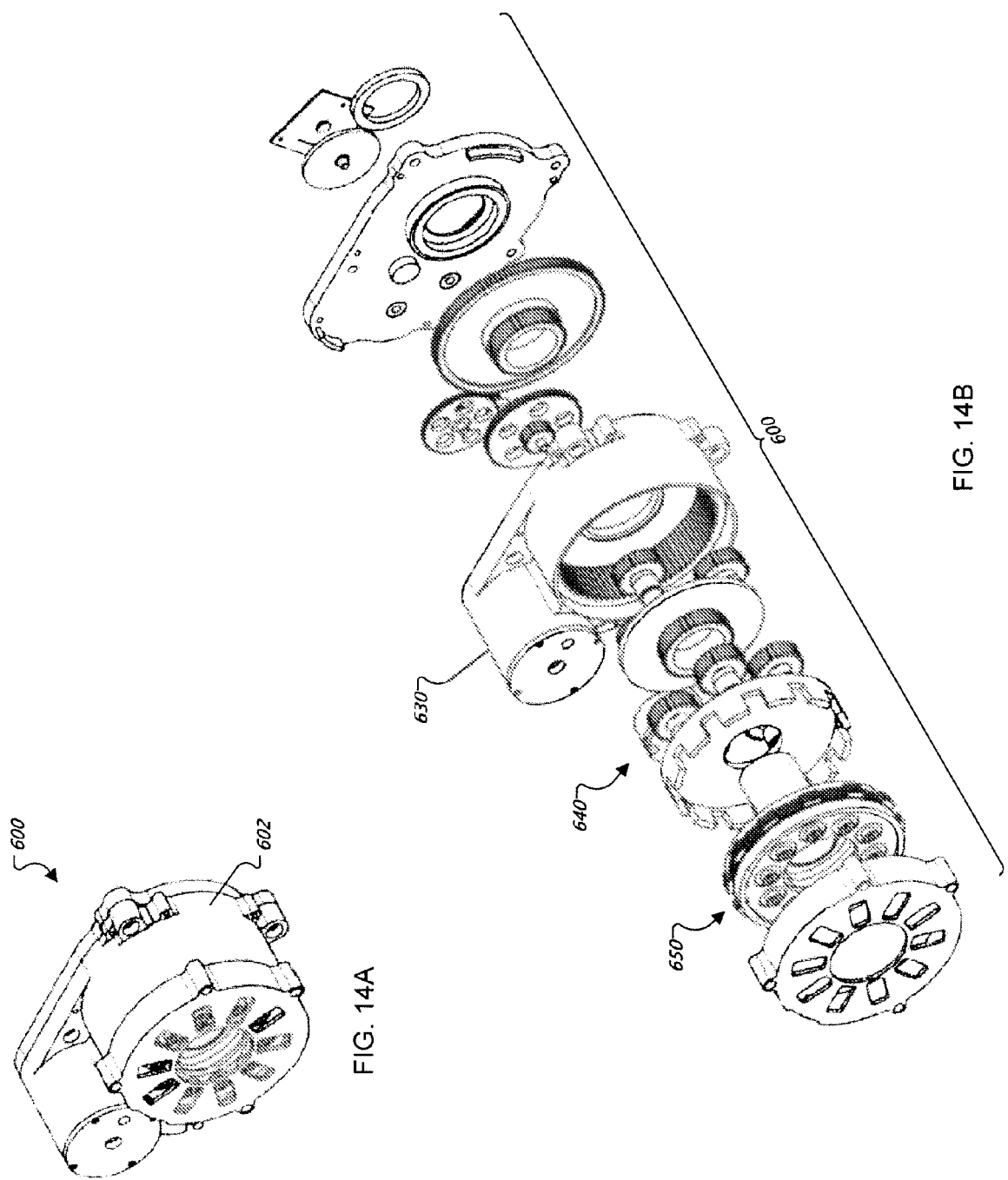

ROBOTIC VEHICLE WITH DYNAMIC RANGE ACTUATORS

CROSS-REFERENCE TO RELATED APPLICATIONS

This U.S. patent application claims priority under 35 U.S.C. §119(e) to U.S. provisional patent application 60/878,877, filed on Jan. 5, 2007, and U.S. provisional patent application 60/908,782, filed on Mar. 29, 2007, the entire contents of the aforementioned applications are hereby incorporated by reference.

STATEMENT AS TO FEDERALLY SPONSORED RESEARCH

This invention was made in part with Government support under contract N41756-06-C-5512 awarded by the Technical Support Working Group of the Department of Defense. The Government may have certain rights in the invention.

TECHNICAL FIELD

This invention relates to robotic vehicles, and more particularly to robotic vehicles with dynamic range actuators.

BACKGROUND

A new generation of robotic systems and tools is required to meet the increasing terrorist threat in the US and abroad. The lack of adaptability and limited capability of existing remote controlled systems available to Hazardous/First Response/Explosive Ordnance Disposal (EOD) teams has frustrated many teams worldwide. The unique and often dangerous tasks associated with the first responder mission require personnel to make quick decisions and often adapt their tools in the field to combat a variety of threats. The tools must be readily available, robust, and yet still provide surgical precision when required.

SUMMARY

In one aspect, a robotic vehicle includes a chassis having front and rear ends, an electric power source supported by the chassis, and multiple drive assemblies supporting the chassis. Each drive assembly includes a track trained about a corresponding drive wheel and a drive control module. The drive control module includes a drive control housing, a drive motor carried by the drive control housing and operable to drive the track, and a drive motor controller in communication with the drive motor. The drive control module may further include a back-drivable gearbox coupling the motor to the track. The drive motor controller includes a signal processor and an amplifier commutator in communication with the drive motor and the signal processor and is capable of delivering both amplified and reduced power to the drive motor from the power source. The drive control module may communicate with a robot controller over a controller area network bus.

In one implementation, the drive motor controller further comprises a health monitor for monitoring the proper functioning of the signal processor and the amplifier commutator. The health monitor sends a signal to the amplifier commutator to cease operation of the motor upon detecting a malfunction. In one instance, the amplifier commutator includes a commutator in communication with the drive motor, a DC/DC converter capable of delivering both amplified and reduced power to the commutator, and a programmable logic circuit in communication with the signal processor, DC/DC converter, and commutator.

In another implementation, the drive control module also includes multiple magnetic field sensors mounted radially about to the motor to detect magnetic pulses, a velocity sensor connected to the motor, and a rotary position sensor connected to the motor. The signal processor comprises logic for three cascading control loops comprising motor current, motor voltage, and motor rotor rotation. The current control loop of the signal processor includes reading a current feedback from the commutator, reading the magnetic field sensors, computing a pulse-width modulation output, writing the pulse-width modulation output to a shared structure accessible by the other control loops, and updating a cycle counter. The voltage control loop of the signal processor includes reading a velocity feedback from the velocity sensor, reading a voltage feedback from the DC/DC converter, computing a commanded current based on a current limit, maximum current from a thermal protection model, and a current rate of change limit, and writing the commanded current to a shared structure accessible by the other control loops. The motor rotor rotation control loop of the signal processor includes reading a rotational position feedback from the rotary position sensor, computing a commanded velocity based on current and velocity limits, and writing the commanded velocity to a shared structure accessible by the other control loops.

In one example, the DC/DC converter receives about 42 V from the power source and is capable of delivering between about 0 V and about 150 V. The power source may include three 14 V batteries in series and three 14 V batteries in parallel, providing about 42 V.

In another example, the drive control module is separately and independently removable from a receptacle of the chassis as a complete unit. The drive control module is also sealed within the receptacle of the chassis from an outside environment and passively cooled by the chassis.

In another aspect, a robotic vehicle includes a chassis having front and rear ends and is supported on right and left driven drive tracks. Each drive track is trained about a corresponding front wheel rotatable about a front wheel axis. Right and left elongated flippers are disposed on corresponding sides of the chassis and are operable to pivot about the front wheel axis of the chassis. Each flipper has a driven flipper track. A flipper actuator module is supported by the chassis and is operable to rotate the flippers. At least one drive module is supported by the chassis and is operably connected to drive at least one of the drive and flipper tracks. A payload deck is configured to support a payload and a linkage connects the payload deck to the chassis. The linkage has a first end rotatably connected to the chassis at a first pivot and a second end rotatably connected to the deck at a second pivot. The first and second pivots include respective linkage actuator modules operable to rotatably position their corresponding pivots to control orientation of the payload deck with respect to the chassis. The track drive modules and actuator modules each include a module housing, a motor supported by the module housing, and a motor controller supported by the module housing and in communication with the motor. The linkage actuator modules are each separately and independently removable as complete units. Also, the track drive modules and the flipper actuator module are each separately and independently removable from respective receptacles of the chassis as complete units. In some examples, the actuator modules are each interchangeable and the track drive modules are each interchangeable. Furthermore, the track drive modules and the flipper actuator module may each be sealed within their respective receptacles of the chassis from an outside environment and passively cooled by the chassis.

In some examples, the track drive modules and actuator modules may each communicate with a robot controller over a controller area network bus. The track drive modules and actuator modules may also include a back-drivable gearbox supported by the module housing and coupled to the motor. Furthermore, the actuator modules may include a slip clutch supported by the module housing and coupled to a planetary gearbox. In one example, the motor of the actuator module provides magnetic braking inhibiting actuation upon power loss.

In one implementation, the motor controller includes a signal processor and an amplifier commutator in communication with the drive motor and the signal processor. The amplifier commutator is capable of delivering both amplified and reduced power to the drive motor.

In another implementation, each module includes a power connector disposed on an outer surface of the module housing and configured to mate with a corresponding power bus connector to establish an electric power connection to the module. Each track drive module establishes an electric power connection with the bus power connector within its respective receptacle as the module is placed within the receptacle.

In yet another aspect, a method of controlling a robotic vehicle includes providing a robotic vehicle that includes a chassis having front and rear ends, at least one electric power source supported by the chassis, and a drive assembly supporting the chassis and driven by a drive control module. The drive control module includes a drive control housing, a drive motor carried by the drive control housing and operable to drive the drive assembly, and a drive motor controller in communication with the drive motor. The drive motor controller includes a signal processor and an amplifier commutator in communication with the drive motor and the signal processor. The method also includes providing a robot controller with a power management control logic that recognizes a power source type and monitors an available power level. The robot controller communicates drive commands to the signal processors of each drive control module based on the power source type and the available power level. In one example, the power management control logic monitors a power source temperature as well. Accordingly, the robot controller communicates to the signal processors of each drive control module, delivering drive commands based on the power source temperature.

In one implementation, the signal processor of the drive motor controller checks for regenerative braking, where upon regenerative braking, the signal processor checks the available power level of the power source and charges the power source until a charged level is attained or regenerative breaking ends.

The robotic vehicle may also include a payload deck supported by the chassis. The payload deck is configured to receive at least one electric power source and includes a payload deck signal processor supported by the payload deck. The payload deck signal processor recognizes a power source type, monitors an available power level, and communicates the power source type and available power level of the at least one electric power source to the robot controller. The payload deck signal processor may communicate with the robot controller over a controller area network bus.

In one example, the robotic vehicle includes a linkage connecting the payload deck to the chassis, the linkage having a first end rotatably connected to the chassis at a first pivot, and a second end rotatably connected to the deck at a second pivot. The first and second pivots include respective linkage actuator modules operable to rotatably position their corresponding pivots to control orientation of the payload deck with respect to the chassis. The actuator modules each include an actuator module housing, an actuator motor supported by the module housing, and an actuator motor controller supported by the module housing and in communication with the actuator motor. The actuator motor controller includes a signal processor, an amplifier commutator in communication with the actuator motor and the signal processor, and a slip clutch supported by the module housing and coupling the actuator motor to the respective pivot.

In one instance, the signal processor of the actuator motor controller checks for regenerative impact absorption, such as when the slip clutch absorbs recoil of the payload deck. Upon regenerative impact absorption, the signal processor of the actuator motor controller checks the available power level of the power source and charges the power source until a charged level is attained or regenerative absorption ends.

The details of one or more implementations of the disclosure are set fourth in the accompanying drawings and the description below. Other features, objects, and advantages will be apparent from the description and drawings, and from the claims.

DESCRIPTION OF DRAWINGS

FIG. 14A is a perspective view of an actuator module.
FIG. 14B is an exploded view of an actuator module.

Like reference symbols in the various drawings indicate like elements.

DETAILED DESCRIPTION

Figure 1:
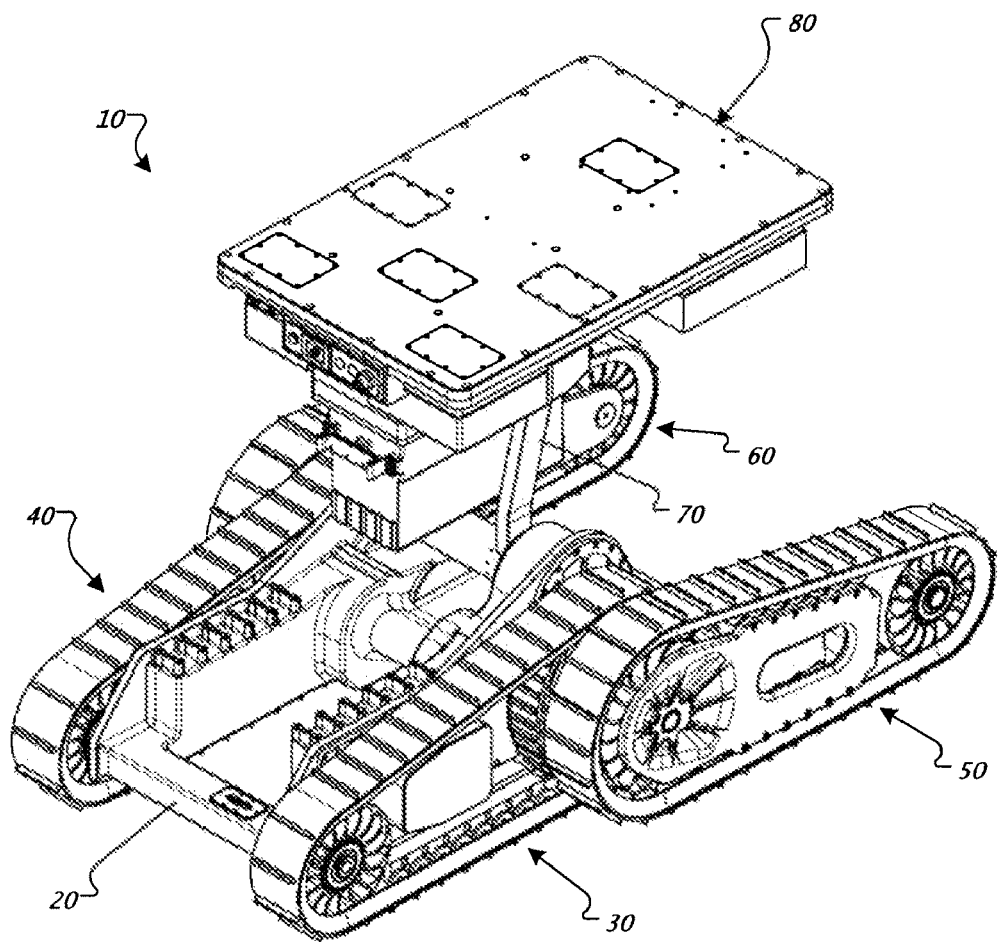
FIG. 1 is a perspective view of a robotic vehicle.
Figure 2:
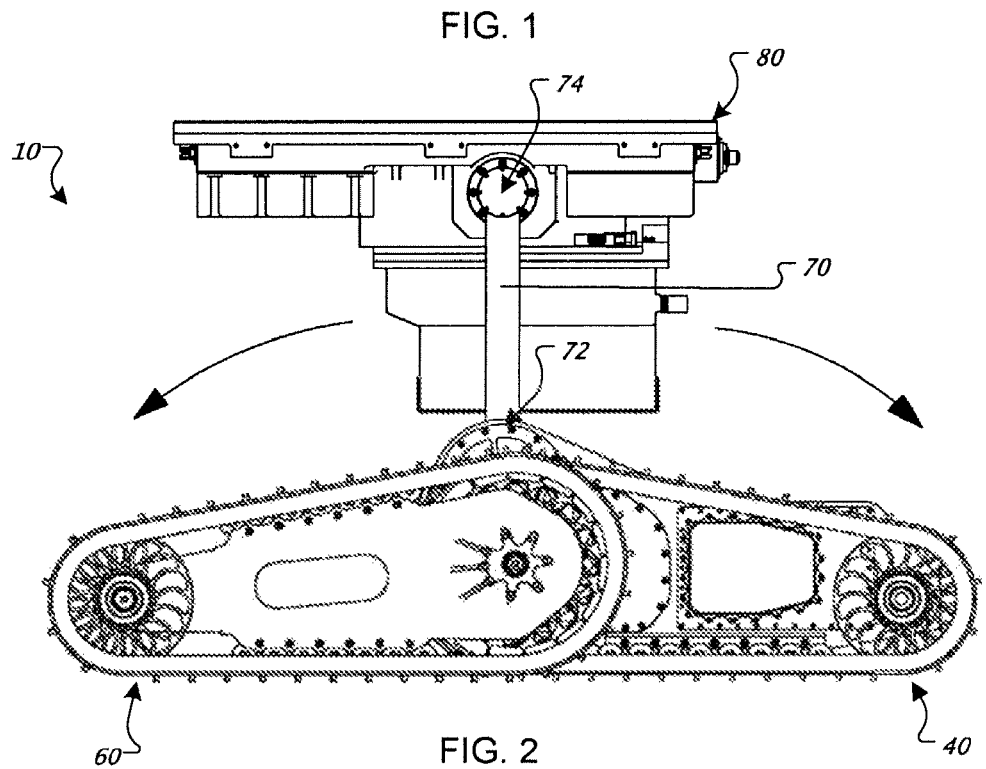
FIG. 2 is a side view of a robotic vehicle.
Figure 3:
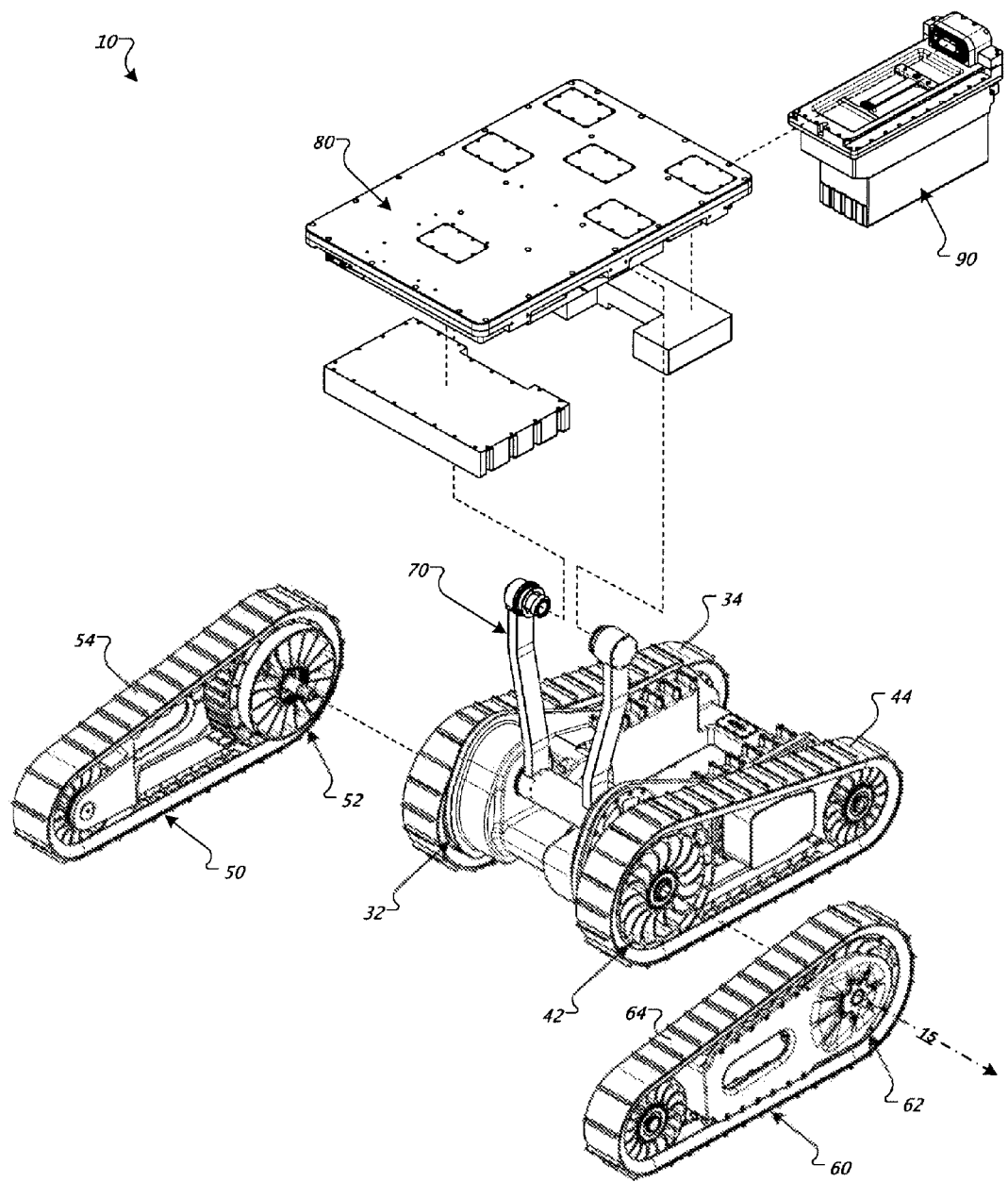
FIG. 3 is an exploded view of a robotic vehicle.
Figure 4:
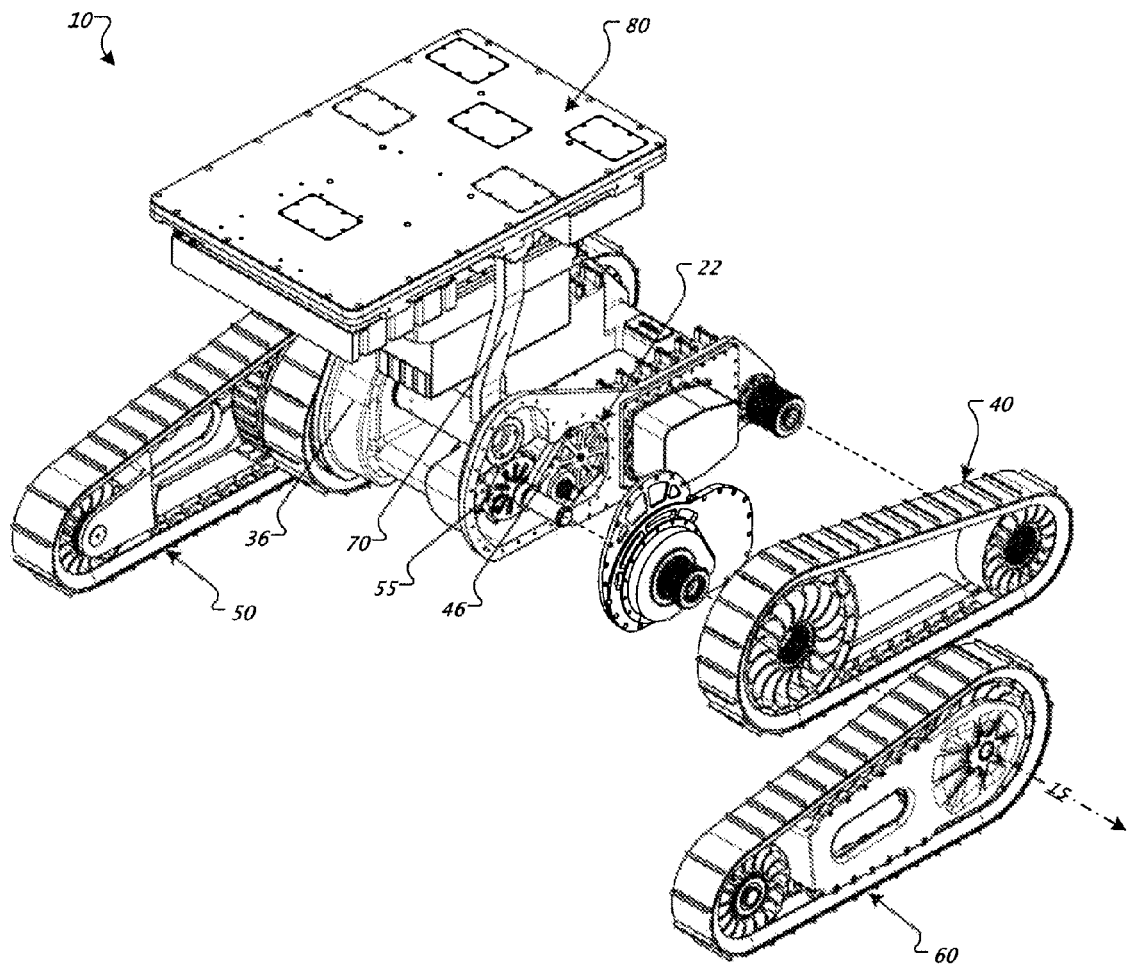
FIG. 4 is an exploded view of a robotic vehicle.

Referring to FIG. 1, a robotic vehicle 10 in one embodiment is a remotely operated vehicle that enables the performance of manpower intensive or high-risk functions (i.e., explosive ordnance disposal; urban intelligence, surveillance, and reconnaissance (ISR) missions; minefield and obstacle reduction; chemical/toxic industrial chemicals (TIC)/toxic industrial materials (TIM); etc.) without exposing operators directly to a hazard. These functions often require the robotic vehicle 10 to drive quickly out to a location, perform a task, and either return quickly or tow something back. The robotic vehicle 10 is operable from a stationary position, on the move, and in various environments and conditions.

Referring to FIGS. 1-4, a robotic vehicle 10 includes a chassis 20 that is supported on right and left drive track assemblies, 30 and 40 respectively, having driven tracks, 34 and 44 respectively. Each driven track, 34 and 44, is trained about a corresponding front wheel, 32 and 42 respectively, which rotates about front wheel axis 15. Right and left flippers 50 and 60 are disposed on corresponding sides of the chassis 20 and are operable to pivot about the front wheel axis 15 of the chassis 20. Each flipper, 50 and 60, has a driven track, 54 and 64 respectively, about its perimeter that is trained about a corresponding rear wheel, 52 and 62, which rotates about the front wheel axis 15.

Figure 5:
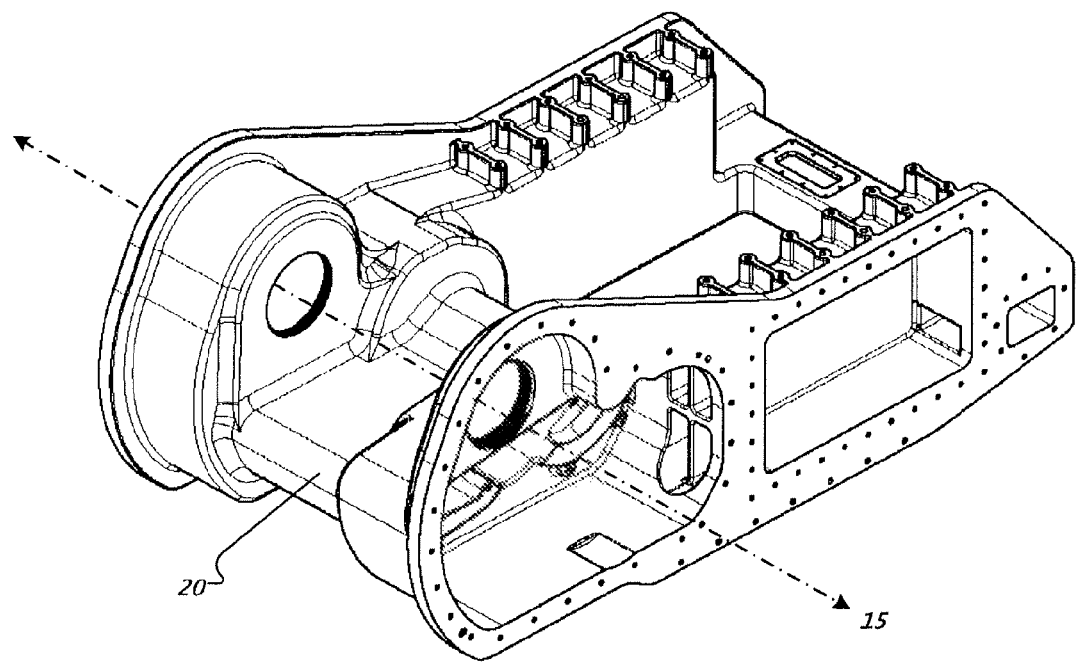
FIG. 5 is perspective view of a chassis of a robotic vehicle.
Figure 6:
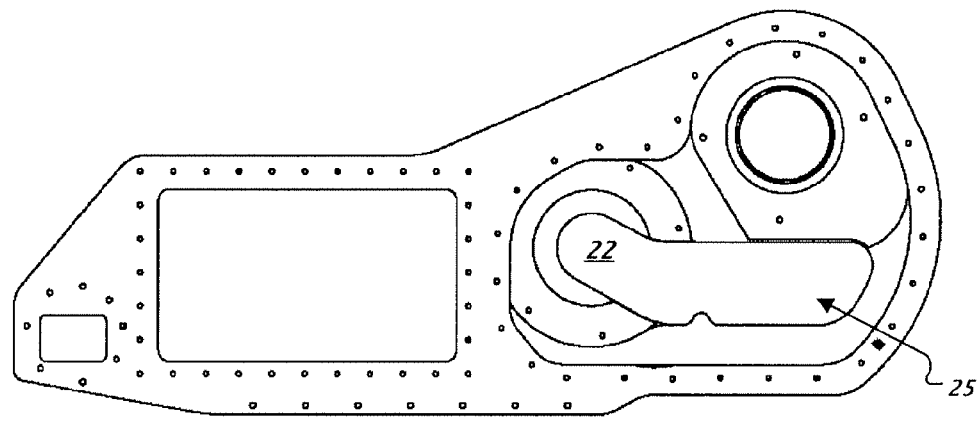
FIG. 6 is side view of a chassis of a robotic vehicle.
Figure 7:
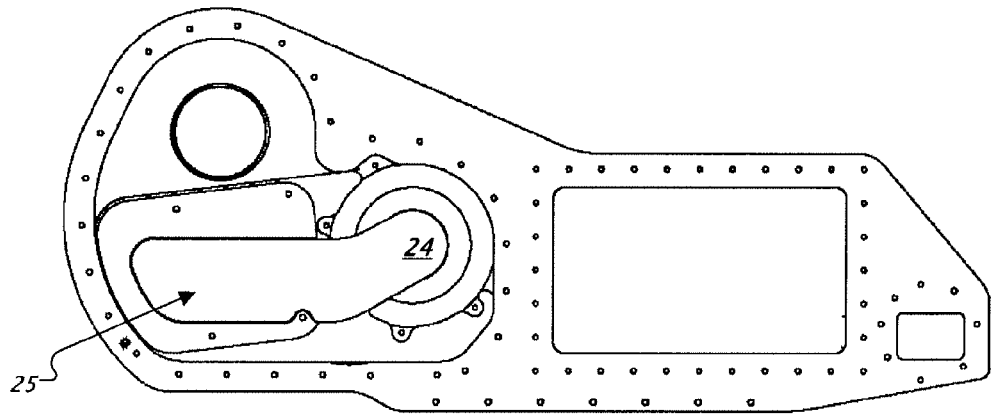
FIG. 7 is side view of a chassis of a robotic vehicle.
Figure 8:
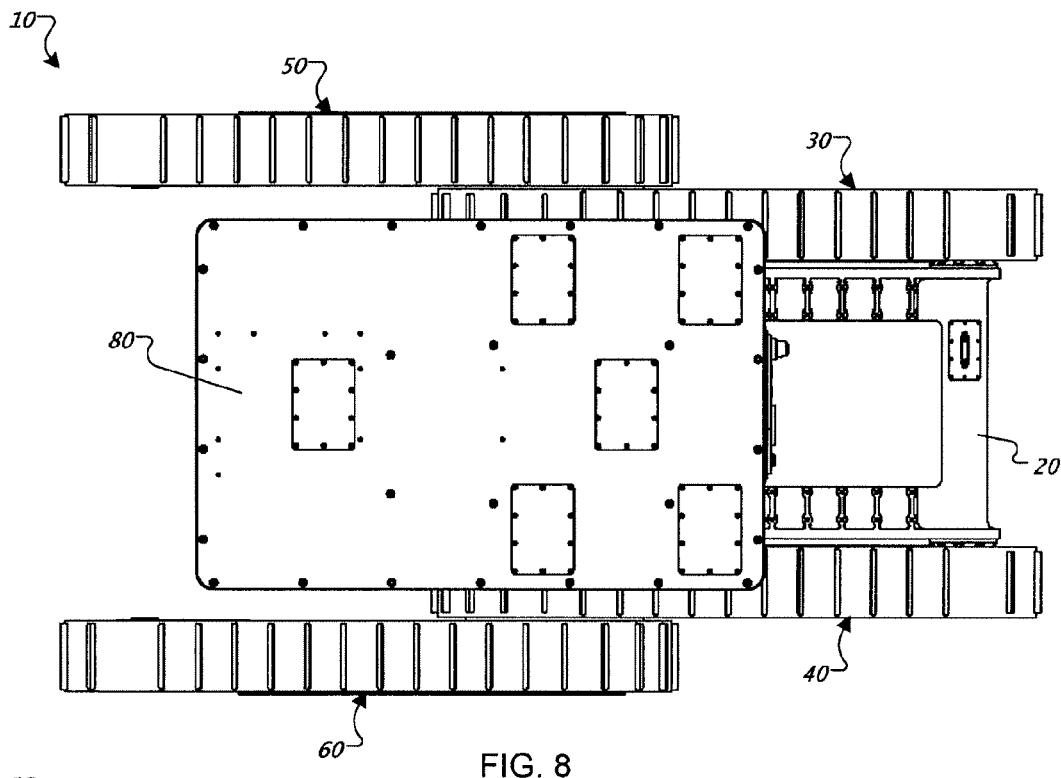
FIG. 8 is a top view of a robotic vehicle.
Figure 9:
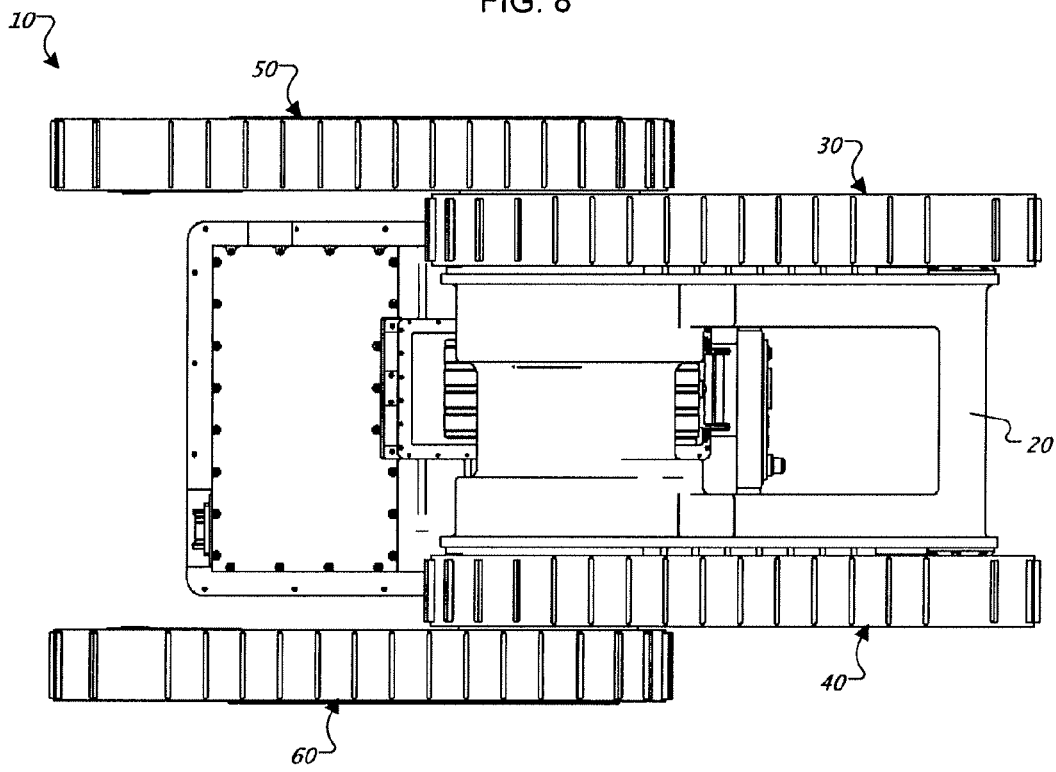
FIG. 9 is a bottom view of a robotic vehicle.
Figure 10:
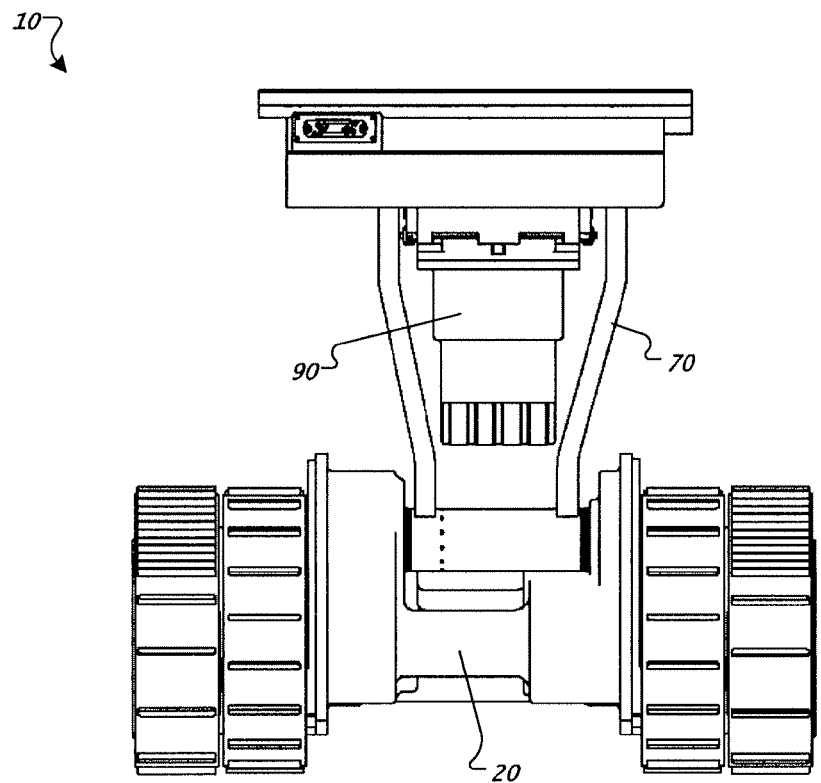
FIG. 10 is a front view of a robotic vehicle.
Figure 11:
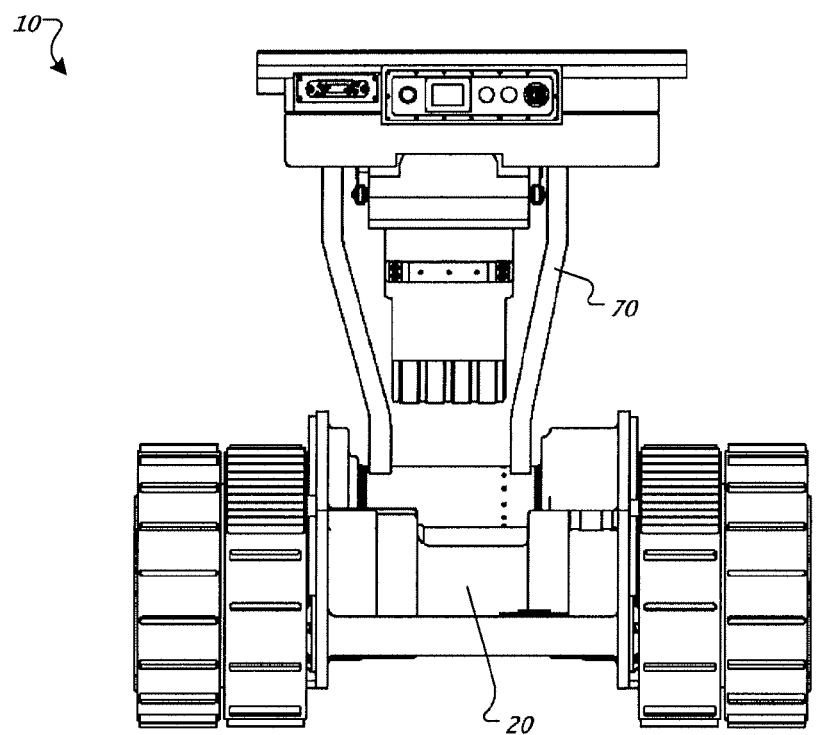
FIG. 11 is a rear view of a robotic vehicle.

At least one drive module 500 is supported by the chassis 20 and is operably connected to drive at least one of the drive tracks, 34 and 44, and flipper tracks, 54 and 64. In one implementation, the robotic vehicle 10 includes right and left drive modules, 36 and 46, driving corresponding drive tracks, 34 and 44, and flipper tracks, 54 and 64. The track drive modules, 36 and 46, are each separately and independently removable from respective receptacles, 22 and 24, of the chassis 20, as shown in FIGS. 5-7, as complete units. Furthermore, the track drive modules, 36 and 46, are each interchangeable.

A flipper actuator module 55 is supported by the chassis 20 and is operable to rotate the flippers, 50 and 60. The flipper actuator module 55 is separately and independently removable from a respective receptacle 25 of the chassis 20, as shown in FIGS. 5-7, as a complete unit.

Referring to FIGS. 1-4 and 8-11, a payload deck 80 is configured to support a payload. A linkage 70 connects the payload deck 80 to the chassis 20. The linkage 70 has a first end rotatably connected to chassis 20 at a first pivot 71, and a second end rotatably connected to the payload deck 80 at a second pivot 73. Both of the first and second pivots, 71 and 73 respectively, include respective linkage actuator modules, 72 and 74, operable to rotatably position their corresponding pivots to control orientation of the payload deck 80 with respect to the chassis 20. The linkage actuator modules, 72 and 74, are each separately and independently removable as complete units. Furthermore, in a preferred implementation, all the actuator modules, 55, 72 and 74, are each interchangeable.

Figure 12:
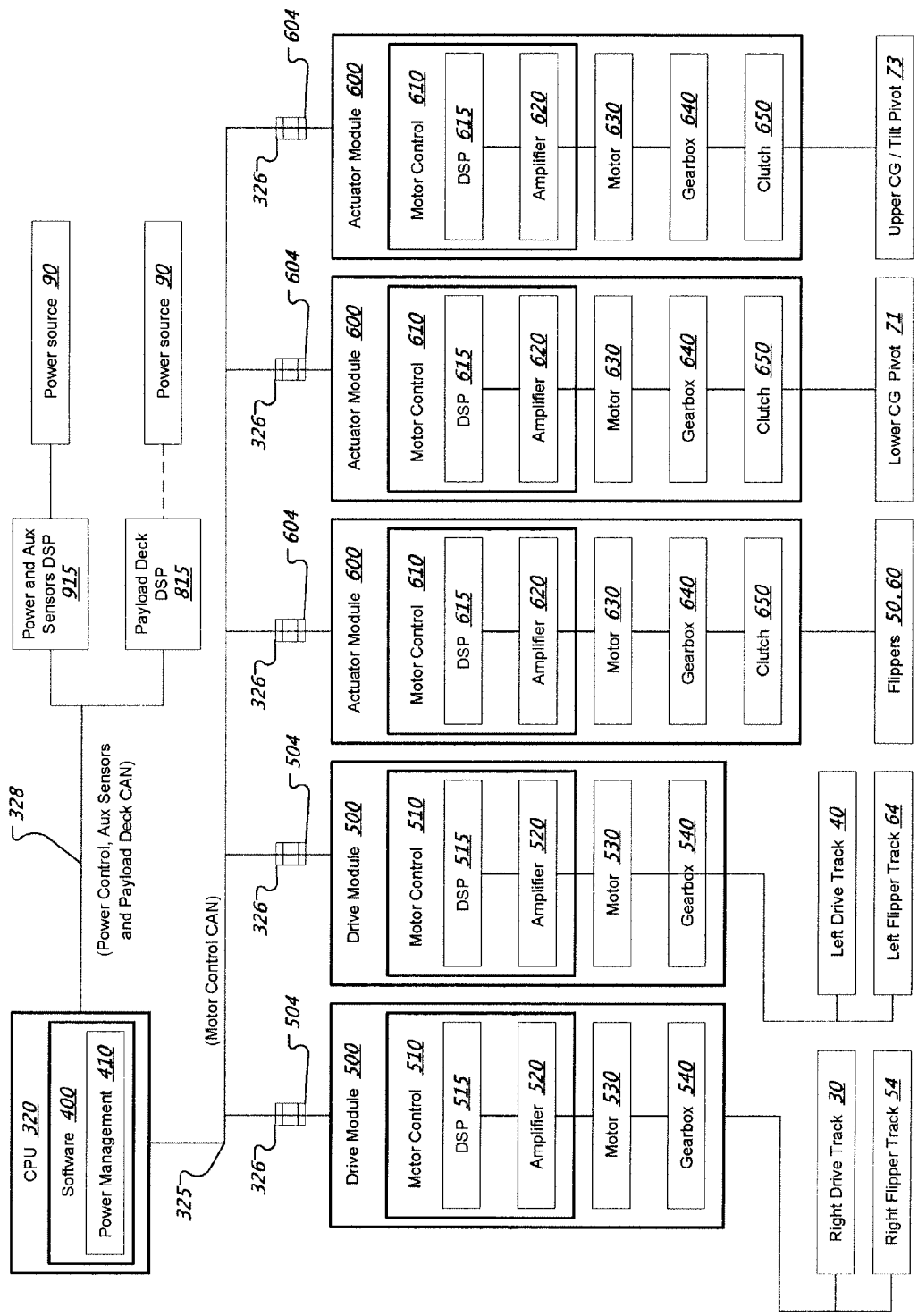
FIG. 12 is a schematic view of a robotic vehicle.
Figure 13C:
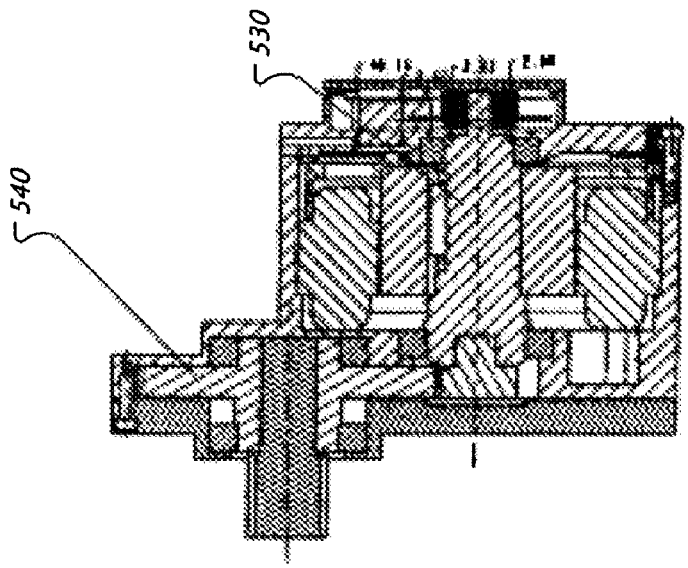
FIG. 13C is a sectional view of a drive module.
Figure 13B:
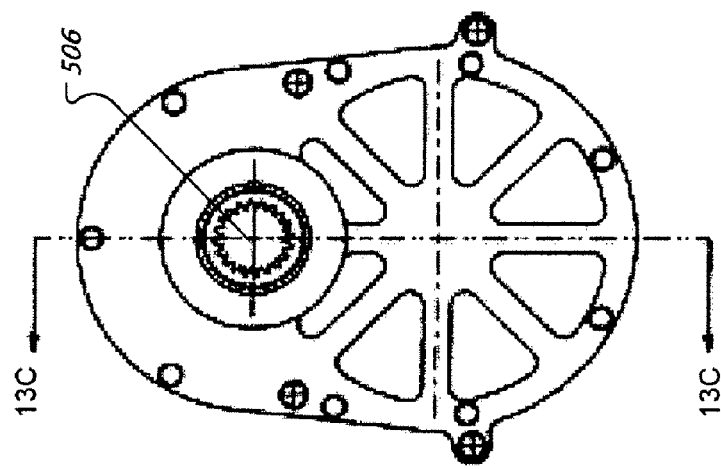
FIG. 13B is a bottom view of a drive module.
Figure 13A:
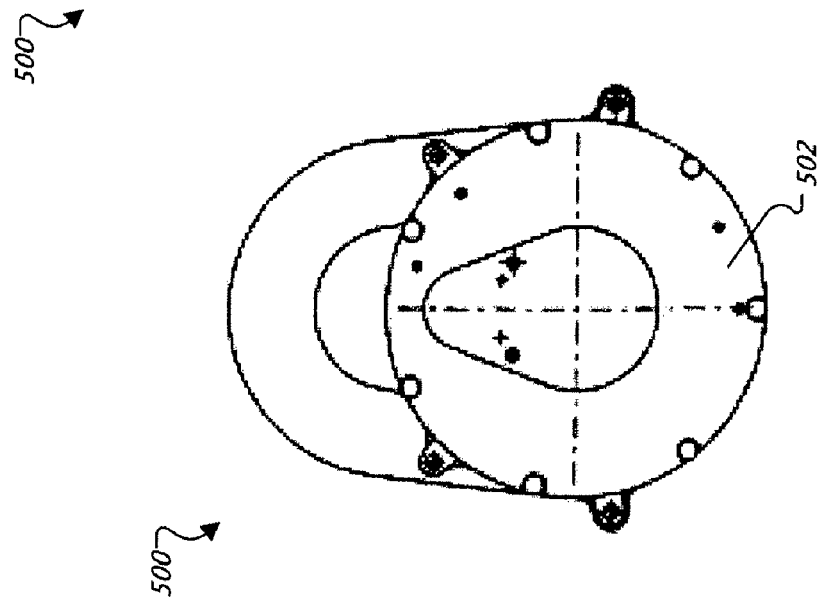
FIG. 13A is a top view of a drive module.
Figure 13D:
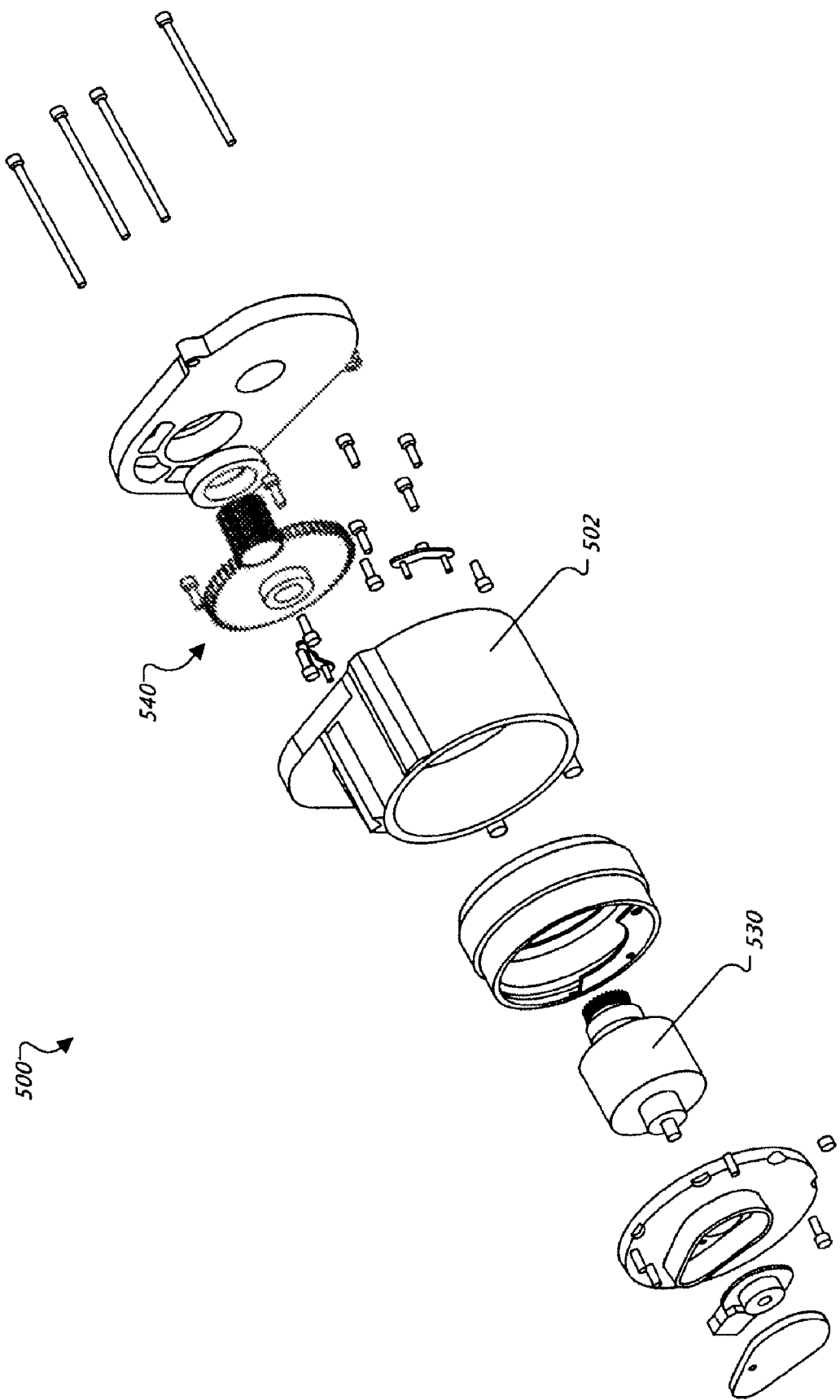
FIG. 13D is an exploded view of a drive module.

FIG. 12 provides a schematic view of the controller, drive and actuator system of a preferred control system for robotic vehicle 10. The robotic vehicle 10 includes a main computer 320 which runs control logic 400 to control the robotic vehicle 10. The main computer 320 communicates with the drive modules 500 and the actuator modules 600 over a motor control controller area network (CAN) bus 325.

FIGS. 12 and 13A-D depict a track drive module 500. The track drive module 500 includes a module housing 502, a motor 530 supported by the module housing 502, and a motor controller 510 supported by the module housing 502 and in communication with the motor 530. In one instance, the motor 530 is a low inductance-high power 2000 W motor providing between about 2000-10500 maximum revelations per minute. This is only an example and the motor design may vary based on required capabilities and other design constraints. In one implementation, the track drive module 500 further includes a back-drivable gearbox 540 (e.g. a planetary gearbox) supported by the module housing 502 and coupled to the motor 530. In one example, the gearbox 540 provides a 30:1 gear reduction. In the depicted implementation, the drive module 500 is also sealed within a respective receptacle, 22, 24, of the chassis 20 from an outside environment and is passively cooled.

FIGS. 12 and 14A-B depict an actuator module 600. The actuator module 600 includes a module housing 602, a motor 630 supported by the module housing 602, and a motor controller 610 supported by the module housing 602 and in communication with the motor 630. In one instance, the motor 630 is a low inductance-high power 500 W motor providing between about 17K-20K maximum revelations per minute. In one implementation, the actuator module 600 further includes a back-drivable planetary gearbox 640 supported by the module housing 602 and coupled to the motor 530. In one example, the gearbox 540 provides a 1700:1 gear reduction. The actuator module 600 also includes a slip clutch 650 supported by the module housing 602 and coupled to the planetary gearbox 640. The slip clutch 650 absorbs impacts to the actuator module 600. For example, when the robotic vehicle 10 maneuvers down off of a ledge onto a ground surface the flippers 50 and 60 incur an initial landing impact that creates a large moment about the front wheel axis 15. The slip clutch 650 allows the flippers 50 and 60 to rotate while overcoming a frictional resistance of the slip clutch 650, thereby absorbing the impact and avoiding damage to the gearbox 640. Likewise, a sudden impact to the payload deck 80 is absorbed by the slip clutch 650 in the actuator modules 600 located at the first and second pivots, 71 and 73 respectively. For example, a disruptor module attached to the payload deck 80 will experience recoil when detonating bombs. The slip clutch 650 in the actuator modules 600 located at the first and second pivots, 71 and 73 respectively, will absorb the sudden recoil, thereby avoiding damage to the gearbox 640. An absolute position encoder 660 disposed on an actuator shaft 606 provides an absolute position of the actuator shaft 606 to the actuator controller 610.

Each module, 500 and 600, includes a power connector, 504 and 604 respectively, disposed on an outer surface of the module housing, 502 and 602 respectively. The power connector, 504 and 604, is configured to mate with a corresponding power bus connector 326 to establish an electric power connection to the module, 500 and 600 respectively. The drive module 500 establishes an electric power connection with the bus power connector 326 within its respective receptacle 22, 24 as the module 500 is placed within the receptacle 22, 24.

In another aspect, a robotic vehicle 10 includes a chassis 20 having front and rear ends, an electric power source 90 (e.g. a bank of nine standard military BB-2590 replaceable and rechargeable lithium-ion batteries or a fuel cell) supported by the chassis 20, and multiple drive assemblies, 30 and 40, supporting the chassis 20. Each drive assembly, 30 and 40, includes a track, 34 and 44, trained about a corresponding drive wheel, 32 and 42, and a drive control module, 36 and 46. Each drive control module, 36 and 46 (also referred to as 500), includes a drive control housing 502, a drive motor 530 carried by the drive control housing 502 and operable to drive the track, 34 and 44 respectively, and a drive motor controller 510 in communication with the drive motor 530. The motor controller 510 includes a signal processor 515 (preferably a digital signal processor (DSP)) and an amplifier commutator 520 in communication with the drive motor 530 and the signal processor 515 and capable of delivering both amplified and reduced power to the drive motor 530 from the power source 90. The ability to provide both amplified and reduced power to a low inductance-high power drive motor 530 provides a dynamic drive range with a gear reduction box 540, rather than a complex transmission.

In one implementation, the track drive module 500 includes a DC drive motor 530, where regenerative braking can be obtained on applications requiring quick stops. DC motor-generated energy is fed back into the electric power source 90 of the dc motor, replenishing available power. In one example, the signal processor 515 uses a resistive load to prevent regenerate energy from passing back to the pour source 90.

In another implementation, the actuator module 600 includes a DC drive motor 630, where regenerative braking can be obtained on applications requiring quick stops or when experiencing recoils such as when the slip clutch 650 absorbs an impact or recoil. DC motor-generated energy is fed back into the electric power source 90 of the dc motor, replenishing available power. In one example, the signal processor 615 uses a resistive load to prevent regenerate energy from passing back to the pour source 90. Furthermore, a magnetic brake within the motor 630 inhibits actuation upon power loss.

Figure 15A:
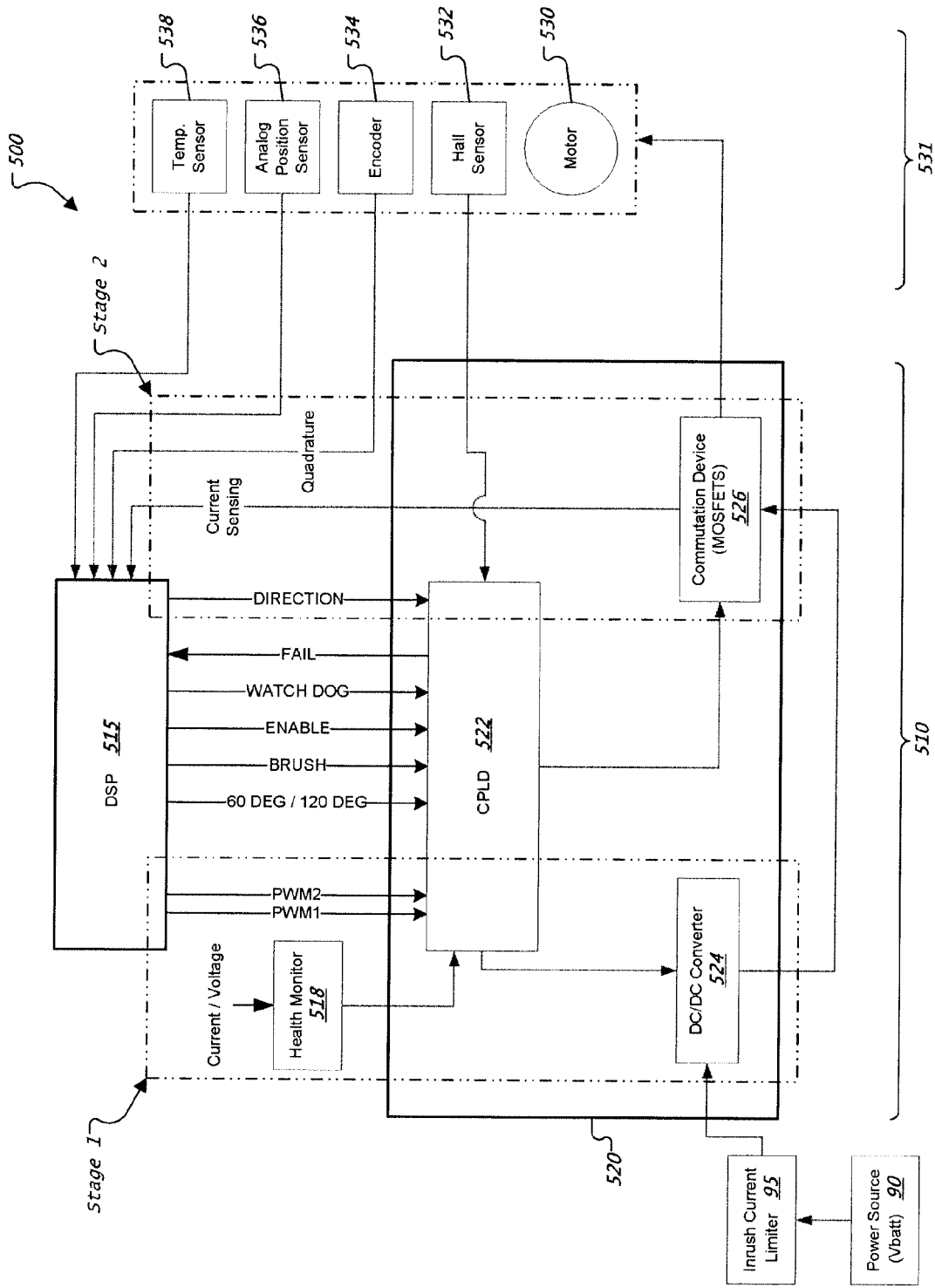
FIG. 15A is a schematic view of a drive module.

FIG. 15A is a block diagram of the drive control module 500. The amplifier commutator 520 includes a commutator 526 in communication with the drive motor 530, a DC/DC converter 524 capable of delivering both amplified (boost) and reduced (buck) power to the commutator 526, and a programmable logic circuit (e.g. a complex programmable logic device (CPLD)) 522 in communication with the signal processor 515, DC/DC converter 524, and commutator 526. The amplifier commutator 520 allows for control of high torque, brushless or brushed motors with fairly accurate position control. In one implementation, the amplifier commutator 520 includes two stages. The first stage provides large motor torque and includes a DC/DC converter 524 for providing voltage to the second stage. The second stage includes a three-phase bridge commutator 326 that allows for control of different kinds of motors. The power supply to the commutator 326 is controlled by a combination of voltage control from the DC/DC converter 524 via pulse-width modulation (PWM) control to the programmable logic circuit 522 and current control via the FETS/commutators of the commutator 526.

In some examples, the motor controller 510 communicates with a motor system 531 which includes the motor 530, multiple magnetic field sensors 532 (e.g. Hall effect sensors) mounted radially about the motor 530 to detect magnetic pulses, a velocity sensor 534 (e.g. an encoder), and a rotary position sensor 536 (e.g. an analog position sensor). The magnetic field sensors sensor 532 measures a motor rotor position or other position information associated with the motor 530 and provides a feedback signal to the programmable logic circuit 522. The signal processor 515 also receives feedback with respect to the motor 530 from the velocity sensor 534 and the rotary position sensor 536. The position sensor 536 obtains position data associated with the gearbox 540 or the shaft 506. Based on these feedback signals, the signal processor 515 can change the duty cycle of the PWM signals. In one example, the motor system 531 also includes a temperature sensor 538 that measures a motor temperature and provides a feedback signal to the signal processor 515.

Figure 15B:
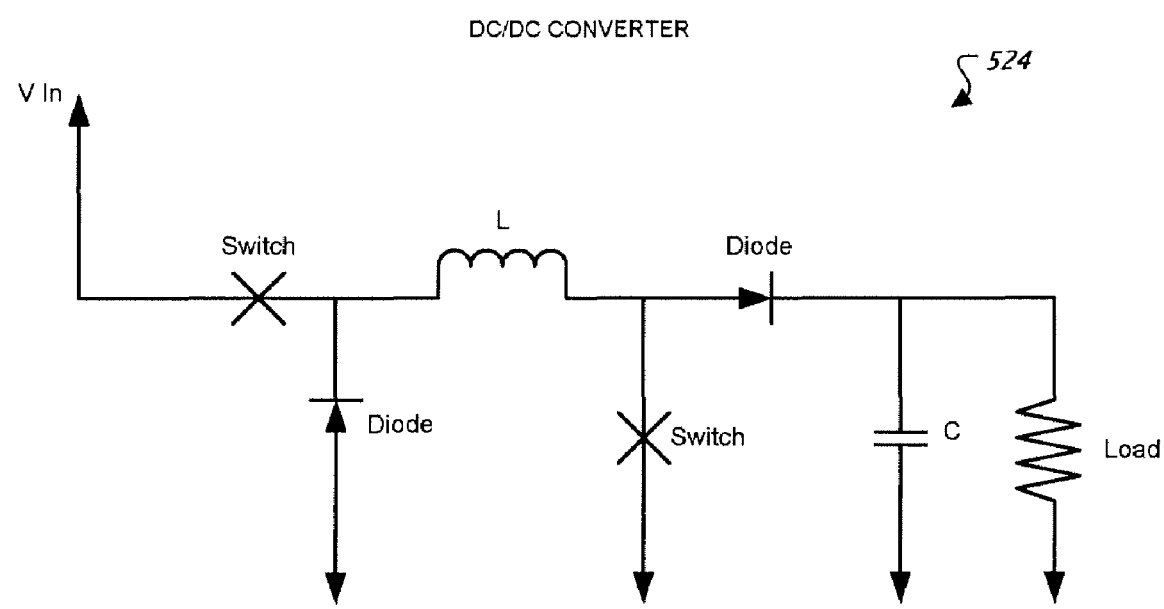
FIG. 15B is a schematic view of a DC/DC converter.

FIG. 15B depicts one example of the DC/DC converter 524. The circuitry for providing buck and boost includes two switches, two diodes, a transistor, and a current storage element including an inductor and a capacitor. The order of these components dictates whether the DC/DC converter 524 provides buck or boost. A bank of FETs switch the direction of current flow in the circuit and therefore its operation. In one example, the DC/DC converter 524 receives about 42 V from the power source 90 and is capable of delivering between about 0 V and about 150 V. The power source 90 may include three 14 V batteries in series and three 14 V batteries in parallel, providing 42 V to the robotic vehicle 10. Furthermore, a current from the power source 90 is controlled by an inrush current limiter 95.

The signal processor 515 controls the amplifier commutator 520. When the robot controller 320 (e.g. a single board computer) sends a drive command to a drive module 500, the signal processor 515 determines whether power amplification (boost) or reduction (buck) is required to perform the command. The signal processor 515 communicates with the programmable logic circuit 522 to operate the DC/DC converter 524 accordingly to provide the appropriate power to the commutator 526, which drives the motor 530.

The motor controller 510 can supply drive signals to a motor 530, such as a brush motor, 3-phase induction motor in scalar control mode or vector control mode (using an encoder), or brushless DC motor in sinusoidal or PWM (using an encoder), and a three-phase AC motor. Hall effect sensors 532, quadrature encoding 534, and a position sensor 536 are available for speed/position feedback (in addition to feedback from the commutators, etc.).

Figure 15C:
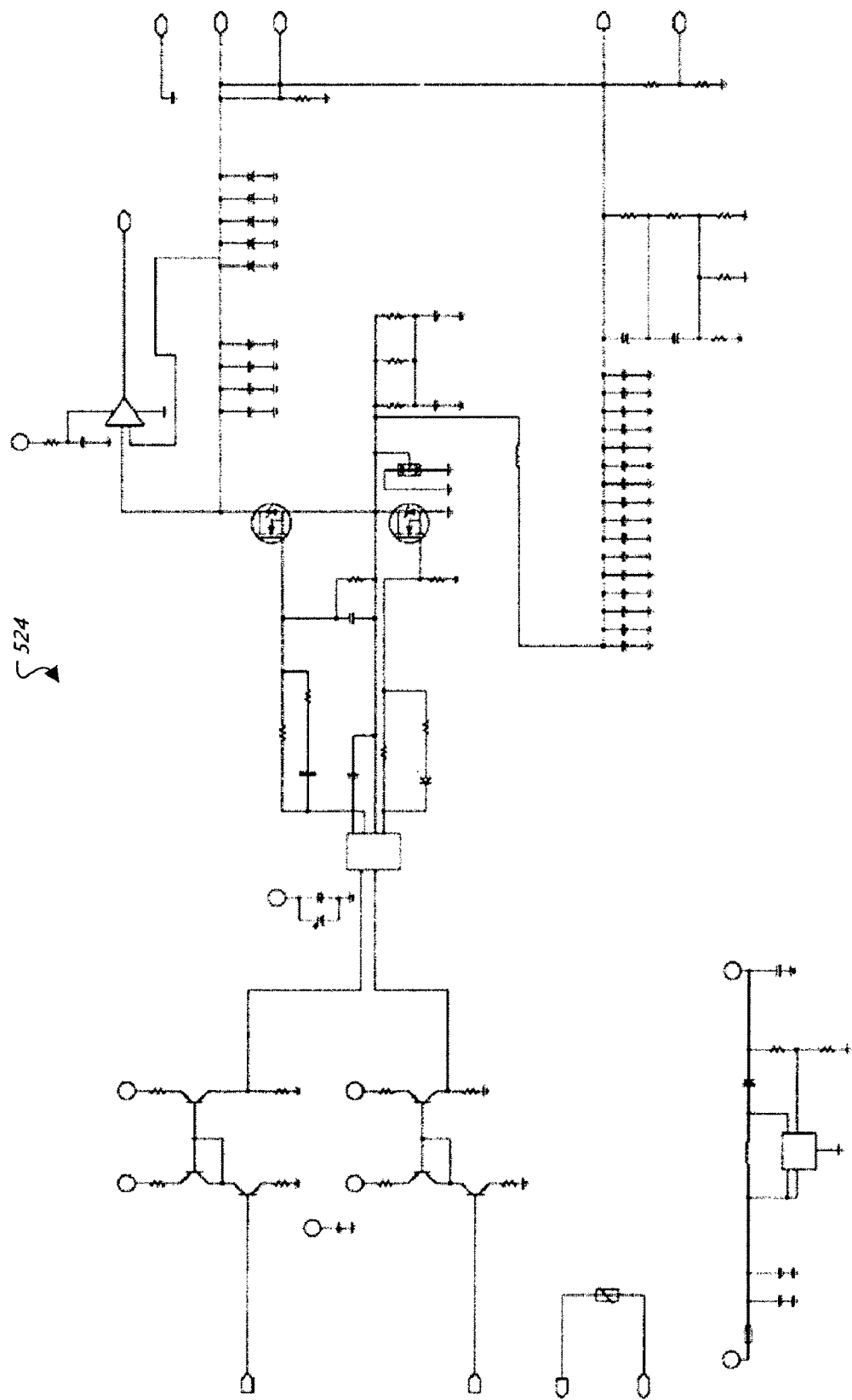
FIG. 15C is a schematic view of a DC/DC converter.

Both the signal processor 515 and the programmable logic circuit 522 can conceivably be considered part of each stage, because of their (control) contribution to e.g., DC/DC conversion in stage 1 (setting the voltage) and to running the FETS of the commutator 326 in stage 2. The DC/DC converter 524 increases/decreases and regulates an input power and can be connected to an inductor. The DC/DC converter 524 receives a pulse-width modulation (PWM) signal from the signal processor 515 via the programmable logic circuit 522 having a duty cycle proportional to the required power. For example, the PWM signal can control one or more switches in the DC/DC converter 524 which control the voltage or current out of the DC/DC converter 524. The signal processor 515 sends two PWM signals to the programmable logic circuit 522 with a duty cycle proportional to current command. PWM1 controls a high site MOSFET and PWM2 controls a low site MOSFET. To avoid through shot current, PWM1 and PWM2 signals have dead time between falling and rising edges. The dead time can be set by signal processor 515, and it can be, for example, 125 nSec. In one implementation, the PWM frequency is 30 kHz. FIGS. 15B-C each provide schematic diagrams of example DC/DC converters 524. Standard electrical symbols known in the art of electronics should be used in interpreting the schematics.

Figure 15D:
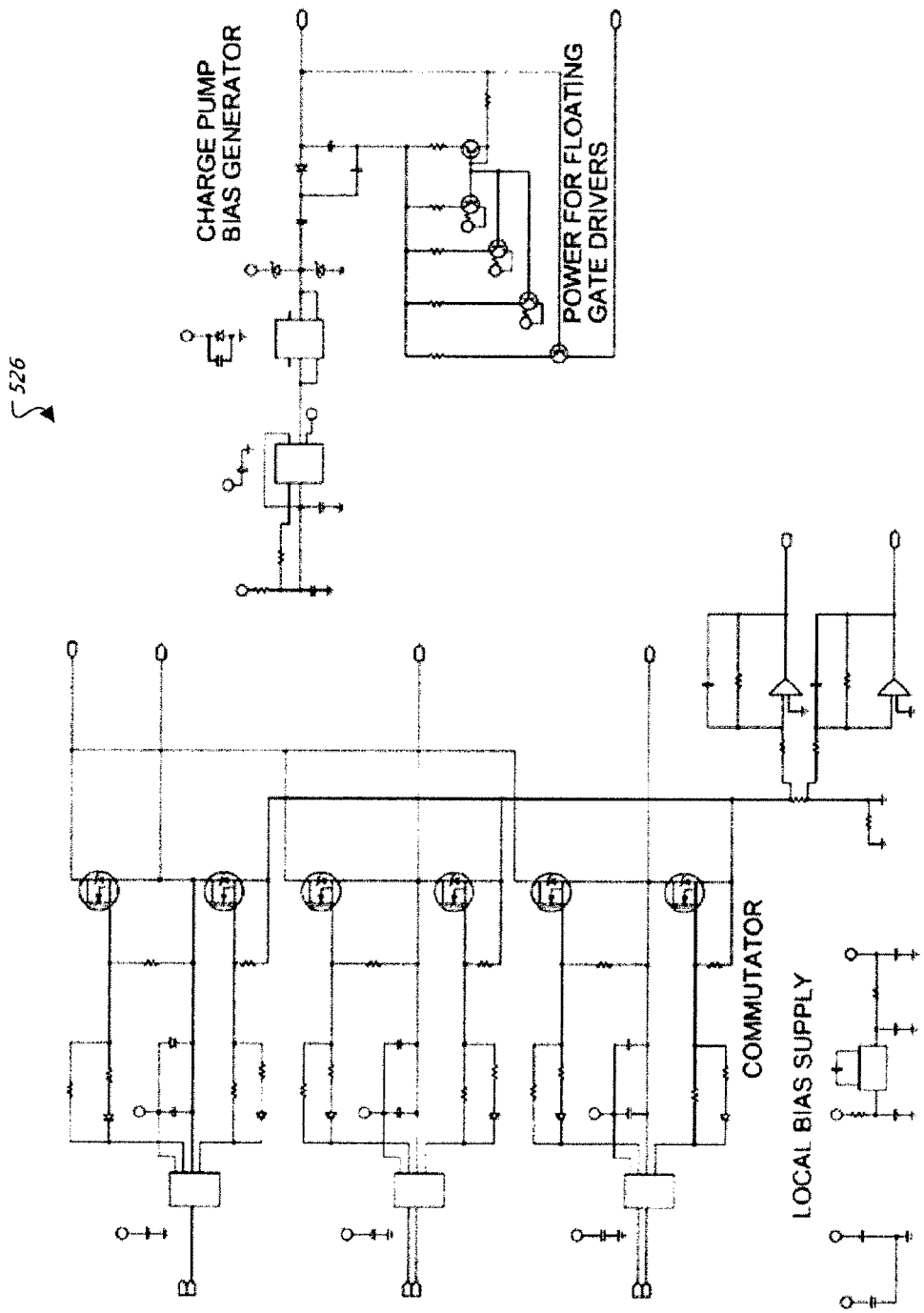
FIG. 15D is a schematic view of a commutator.

The programmable logic circuit 522, in one example, provides commutation signals for six power MOSFETs of the commutator 326 assembled as a three phase bridge and acts as a protection device for a variety of signals. FIG. 15D provides a schematic diagram of one example of a commutator 326. The commutation signals provided by the programmable logic circuit 522 result from a logic conversion of inputs from three Hall effect sensors 532 and a direction input from the signal processor 515. Six output signals from the programmable logic circuit 522 are received by and control the power MOSFETs of the commutator 326. Commutation signals can be generated for 60° or 120° spaced Hall sensors 532. Protection logic verifies that Gray Code is not violated. In cases where a violation of Gray Code or Hall conditions occur, a commutation fault signal is established. The commutation sequence changes depending on the direction command.

The signal processor 515 may send a signal to the programmable logic circuit 522 to operate in a brushless mode or a brush mode. Accordingly, commutation signals can be generated for brushed and brushless DC motors. In brushless mode, the programmable logic circuit 522 receives a feedback signal from the Hall effect sensors 532 and sends control signals based on the Hall sensor feedback signal to an H-bridge included with the commutator 326 to control the motor 530. The signal processor 515 uses commutation signals from tables associated with brushless operation and sends a signal to the commutator 326 accordingly. In brush mode, the signal processor 515 receives feedback from the encoder 534 and sends control signals to the commutator 326 through the programmable logic circuit 522 based at least in part on an encoder signal. The programmable logic circuit 522 uses commutation signals from tables associated with brush operation and sends a signal to the commutator 326 accordingly. The commutator 326 controls the motor 530 using the H-bridge. Furthermore, in the case of a brushed motor, phase A or B is used to commutate the motor depending on the direction command.

After receiving the operation mode, the programmable logic circuit 522 provides a control signal to the commutator 326. The commutator 326 drives the motor 530 with DC power from the DC/DC converter 524 and changes a direction of motor rotation based on direction control signals from the signal processor 515 via the programmable logic circuit 522. The signal processor 515 can receive a current sensing feedback signal from the commutator 326 and use the current sensing feedback signal to control a duty cycle of the PWM signals to the DC/DC converter 524.

The signal processor 515 includes three cascading control loops for: 1) motor current (≈torque) and commutation; 2) motor voltage (≈speed); and 3) motor rotor position. The signal processor 515 monitors feedback from the motor current at about 30 kHz (33 µSec), the motor voltage at about 250 Hz (4 milliseconds), and the motor rotor position at about 50 Hz (10 milliseconds). For each current control loop iteration, the signal processor 515 reads the current sensing feedback from the commutator 326, reads the Hall effect sensors 532, computes a PWM output, writes the PWM output to a shared structure accessible by the other control loops, and updates a cycle counter. The signal processor 515 monitors the Hall effect sensors 532 to insure that they do not all have the same value. For each voltage control loop iteration, triggered by a software interrupt in the current control loop, the signal processor 515 reads a velocity feedback from the encoder 534, reads the voltage feedback from the DC/DC converter 524, and computes a commanded current based on a current limit, maximum current from a thermal protection model, and a current rate of change limit. The signal processor 515 writes the commanded current to a shared structure accessible by the other control loops. The signal processor 515 also checks for a stall condition and for regenerative braking. If regenerative braking is detected, the signal processor 515 checks the available power level of the power source 90 and charges the power source 90 until a charged level is attained. For each position control loop iteration, the signal processor 515 reads the position feedback from the position sensor 536, computes a commanded velocity based on current and velocity limits, and writes the commanded velocity to a shared structure accessible by the other control loops.

Figure 15E:
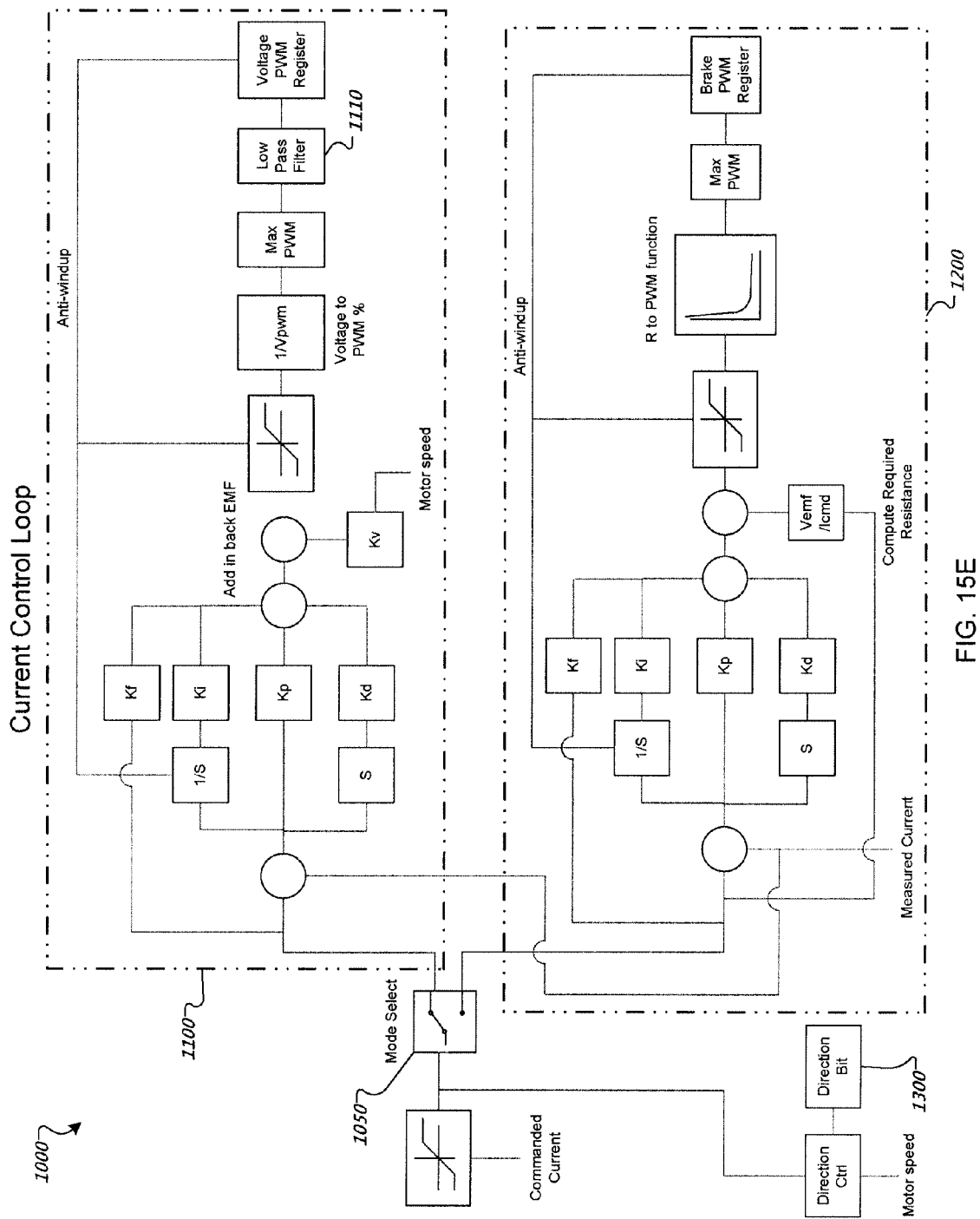
FIG. 15E is a schematic view of control logic for a digital signal processor.
Figure 15F:
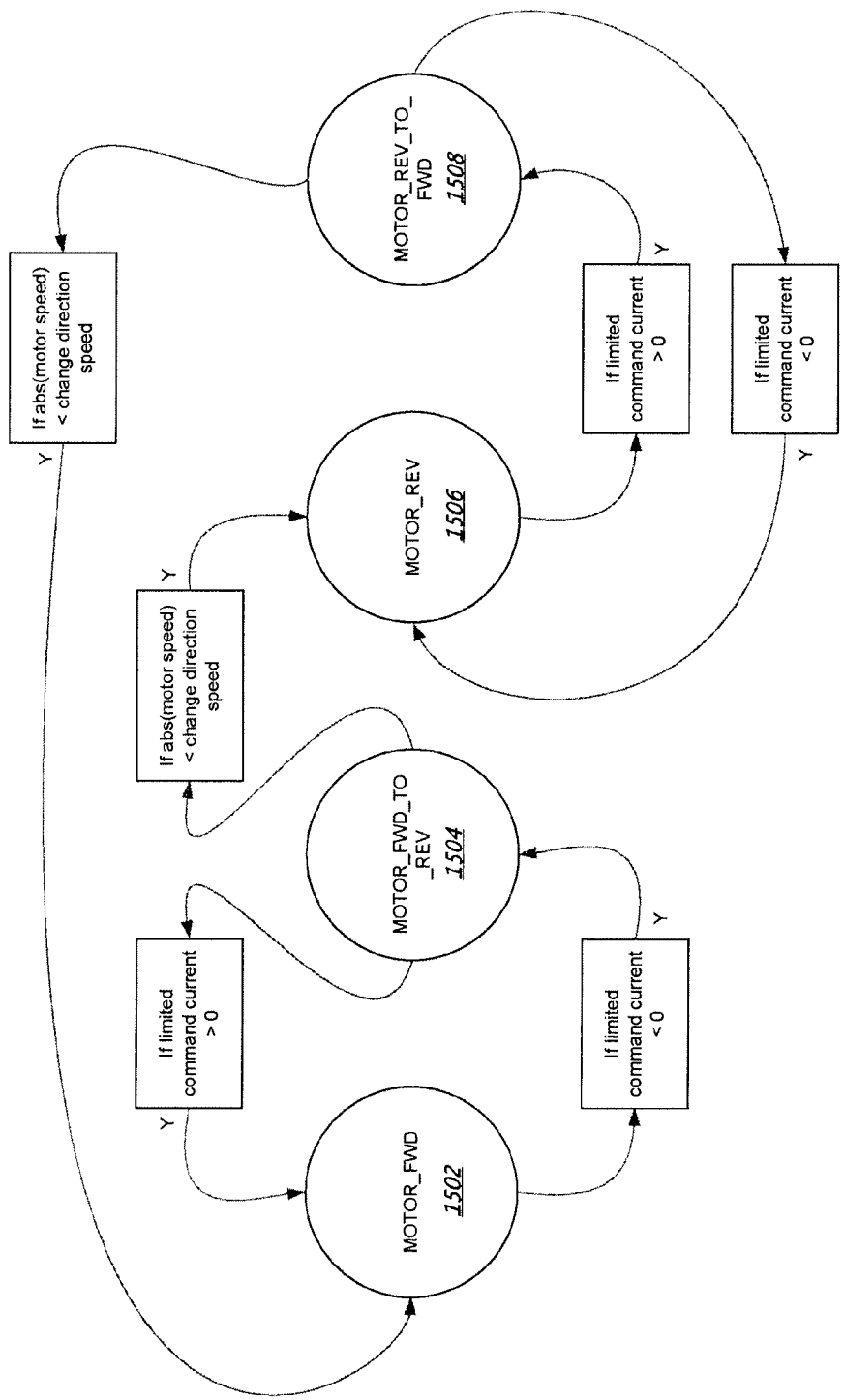
FIG. 15F is a motor current direction state diagram.
Figure 15G:
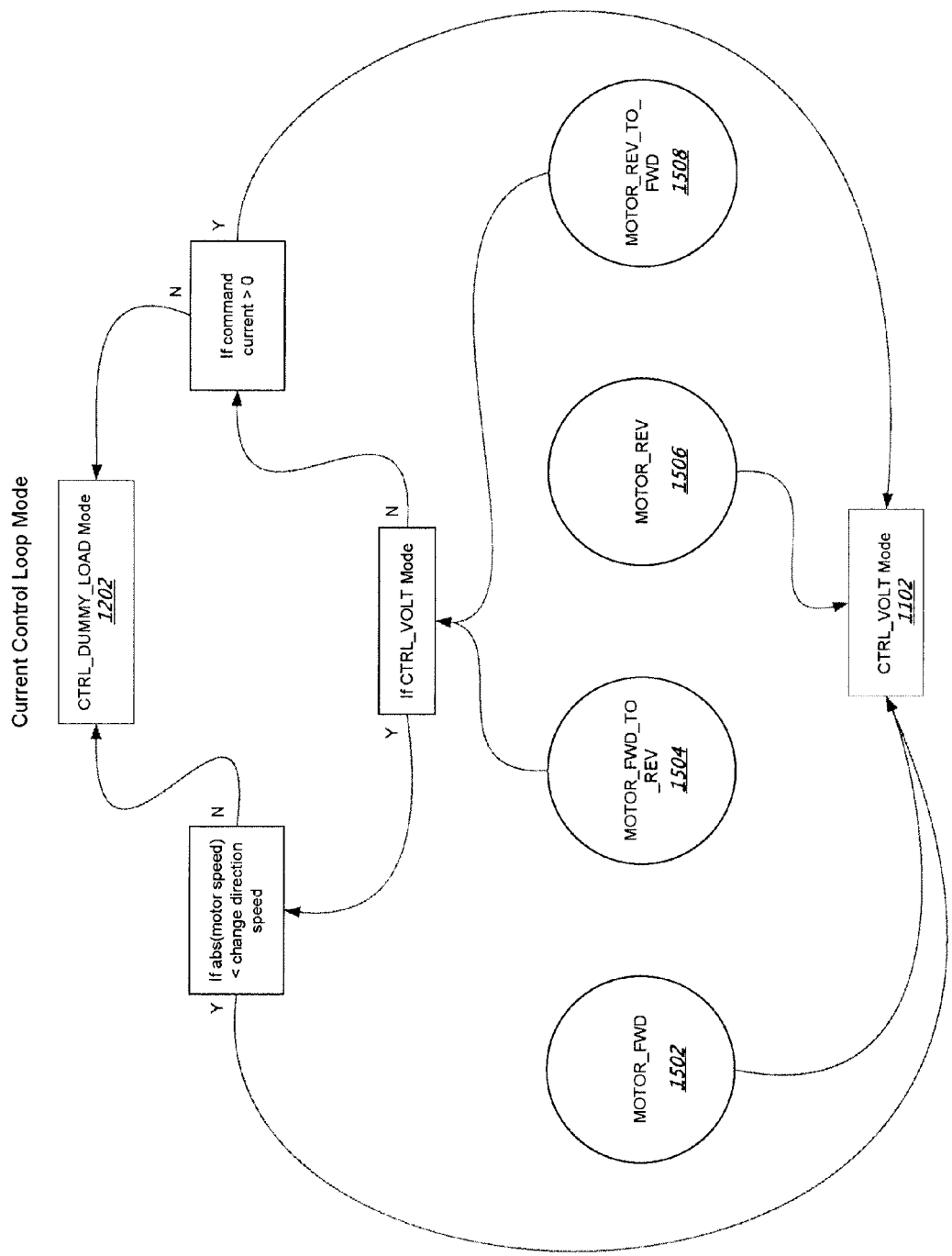
FIG. 15G is a current control loop mode diagram.

Referring to FIGS. 15E-G, for the drive module 500 and the actuator module 600, the motor control logic on the DSP 515, 615 provides a buck-PWM, which is PWM control from 0 volts to a supply voltage; a brake-PWM, which is PWM control of a dummy load resister across the motor 530, 630; a direction bit, which sets the commutation direction for the CPLD 522; and a commutation inhibit, which inhibits commutation when the motor 530, 630 is acting like a generator. For the drive module 500, the motor control logic on the DSP 515 also provides a boost-PWM, which is PWM control of a voltage booster for the motor 530 to command more than the supply voltage to the motor 530.

In a positioning system, a motor current loop (controlling acceleration) forms a part of a velocity loop (controlling motor speed), which in turn is part of an outer loop of position, which has desired position as a reference. An error in position calls for more or less speed, and an error in speed calls for more or less acceleration (current). Each loop must be stabilized, or preferably optimized, starting with the innermost loop.

The control structure includes a torque (or current) PID (Proportional-Integral-Derivative) control loop 1000 and a velocity PID control loop 2000 on top of the current control loop 1000. Each element of the PID control loop 1000, 2000 refers to a particular action taken on an error. An output control variable (CV) is based on the error (e) between a user-defined set point (SP) and a measured process variable (PV). The proportional element is the error multiplied by a gain, Kp. This is an adjustable amplifier and is responsible for process stability (e.g. too low and the PV can drift away; too high and the PV can oscillate). The integral element is an integral of error multiplied by a gain, Ki, which is responsible for driving the error to zero. However, setting Ki too high invites oscillation or instability, integrator windup, or actuator saturation. The derivative element is a rate of change of error multiplied by a gain, Kd, which is responsible for system response (e.g. too high and the PV will oscillate; too low and the PV will respond sluggishly). Tuning of a PID involves the adjustment of Kp, Ki, and Kd to achieve some user-defined "optimal" character of system response. Another adjustment for achieving an optimum performance may include maximizing low frequency gain, Kf, and minimizing high frequency gain, Kf.

The torque (current) control loop 1000 includes a voltage loop 1100 and a dummy load or brake loop 1200. The torque control loop 1000 also determines a direction bit 1300 of the commutator 526. The input command current is rate and value limited. A sign (+/−) of the limited command current is used to determine a desired motor direction.

Referring to FIG. 15F, a motor current direction state diagram, there are four motor current direction states, which include a MOTOR_FWD state 1502, a MOTOR_FWD_TO_REV state 1504, a MOTOR_REV state 1506, and a MOTOR_REV_TO_FWD state 1508. The MOTOR_FWD state 1502 exists when the motor 530 is running in a forward direction. The MOTOR_REV state 1506 exists when the motor 530 is running in a reverse direction. The MOTOR_FWD_TO_REV state 1504 is a transitional state when the motor 530 is changing from the forward direction to the reverse direction. The MOTOR_REV_TO_FWD state 1508 is also a transitional state when the motor 530 is changing from the reverse direction to the forward direction. If the motor current direction state is MOTOR_FWD 1502, then if the limited command current is less than zero, move to the MOTOR_FWD_TO_REV state 1504. If the current direction state is MOTOR_REV, then if the limited command current is greater than zero, move to the MOTOR_REV_TO_FWD state 1508. If the current direction state is MOTOR_FWD_TO_REV 1504, then if an absolute value of the motor speed is less than a change direction speed, move to the MOTOR_REV state 1506. If the limited command current is greater than zero, move to the MOTOR_FWD state 1502. If the current direction state is MOTOR_REV_TO_FWD 1508, then if an absolute value of the motor speed is less then the change direction speed, move to the MOTOR_FWD state 1502. If the limited command current is less than zero, move back to the MOTOR_REV state 1506. The change direction speed is the fastest speed the motor can operate at while changing the commutation direction by changing the direction bit 1300. Changing the direction bit 1300 while operating the motor 530 at a faster speed could destroy the FETs 526 controlling the motor 530. The state machine described above is set up to change the direction bit 1300 in a controlled manner, thereby avoiding damage to the system. The direction bit 1300 is set once a current direction state is determined and the direction bit 1300 is changed only while in the MOTOR_FWD 1502 or MOTOR_REV 1506 current direction states. The direction bit 1300 remains uncharged while in transition current direction states (MOTOR_FWD_TO_REV 1504 or MOTOR_REV_TO_FWD 1508).

Referring to FIGS. 15E and 15G, the mode select block 1050 of motor control logic on the DSP 515 determines which PID loop (the voltage control loop 1100 or the dummy load control loop 1200) to run. The motor control logic does not switch between using the voltage control loop 1100 to control the current and the dummy load control loop 1200 to control the current unless the command current changes sign (+/−). If the current direction state is MOTOR_FWD 1502 or MOTOR_REV 1506, the motor control logic runs the voltage loop 1100 in a CTRL_VOLT mode 1102 and uses the voltage PWM to control the motor current. If the current direction state is MOTOR_FWD_TO_REV 1504 or MOTOR_REV_TO_FWD 1508 and the motor control logic is in a CTRL_VOLT mode 1102 (using the voltage to control the current), then if an absolute value of the motor speed is less than the change direction speed, continue in the CTRL_VOLT mode and use the voltage PWM; otherwise, set the motor control logic mode to CTRL_DUMMY_LOAD 1202 and use the PWM from the dummy load or brake control loop 1200 to slow the motor down. If the current direction state is MOTOR_FWD_TO_REV 1504 or MOTOR_REV_TO_FWD 1508 and the motor control logic is in the CTRL_DUMMY_LOAD mode 1102, continue in the CTRL_ DUMMY_LOAD mode 1202 and use the dummy load PWM. If the current is greater than zero, set the motor control logic mode to CTRL_VOLT 1102; else, set the mode to CTRL_DUMMY_LOAD 1202.

Both the voltage PID loop 1100 and the dummy load PID loop 1200 have the same Integrator decay, Anti-windup, Integrator limiting and command rate limiting measures as the velocity loop 2000.

Referring again to FIG. 15E, in the voltage control loop 1100, a computed back EMF needed to keep the motor 530 at the current speed is added to the PID loop command. This floats the PID loop 1100, meaning the PID does not need to create as big a command and does not need to keep as large a value in the integrator as it would otherwise. While in buck mode, the control logic uses the current supply voltage as the divisor when converting the command voltage to % PWM. While in buck-boost mode, the control logic uses a boost max voltage as the divisor when converting the command voltage to % PWM. The PMW command is sent through a low pass filter 1110, which in buck mode, dithers the PWM command to provide smooth control at low speeds. Some of the bottom and top PWM is lost due to the rising and falling edge delay added to the PWM generator. A PWM command of zero to min-PWM, is zero in effect. Running the loop 1100 relatively fast allows low pass filtering the PWM command without issue. The low pass filter 1110 makes the PWM command turn on and off proportionally to the lower PWM command, providing voltage control. In effect, the control logic pulse width modulates the PWM command. In Buck-Boost mode, a dead band exists at an upper end of the buck PWM and at a lower end of the boost PWM. The low pass filter 1110 of the PWM command dithers the PWM in this range allowing control of the current even in the dead band.

In the brake or dummy load loop 1200, the control logic computes the estimated resistance needed for the current command (R=Vemf/Icmd) and adds it to the output of the PID loop 1200. Like adding the back EMF in the voltage loop, this helps float the PID loop 1200 so that it does not need as large of gains and integrator wind up. Since the conversion from commanded resistance to PWM is non-linear, the control logic converts a requested resistance to PWM after the PID and estimated resistance are added together to keep the non-linearity out of the PID loop 1200. Unlike the voltage loop 1100, a low pass filter is not applied to the PWM command. Since shoot through is not a concern, the dead band generator is not running, and there is smooth control from zero to max-PWM.

The current loop 1000 toggles a software watchdog timer at 25 KHz that is sent to an external watchdog timer, which will reset the DSP 515 if the software stops running. A motor amplifier watchdog to the CPLD 522 is toggled at 25 KHz in the current loop 1000 as long as no hardware fault is detected, and is used for brown out protection. If the supply voltage falls below a brownout voltage, the motor amplifier 520 is disabled because the DSP 515 stops toggling a GPIO bit.

Figure 15H:
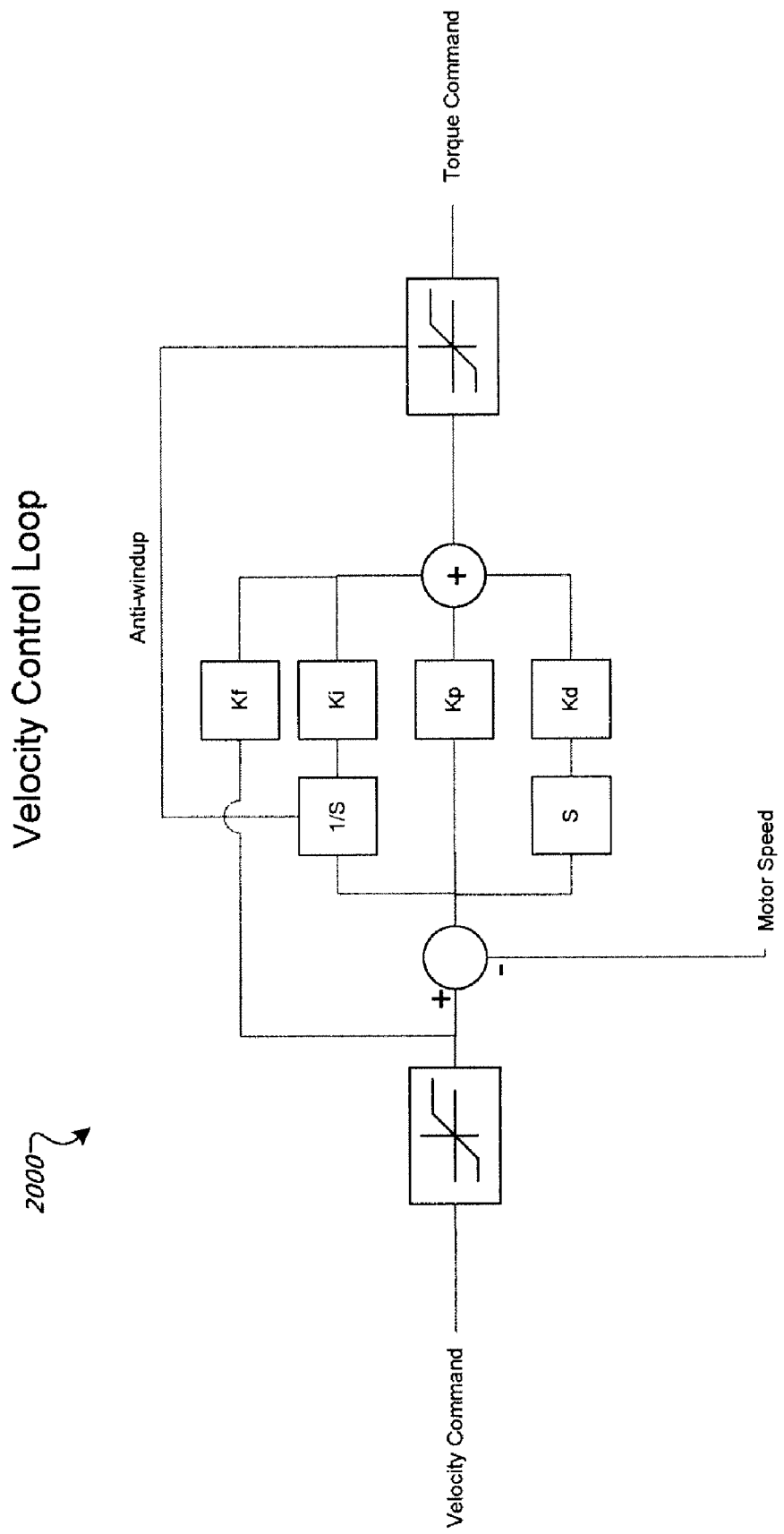
FIG. 15H is a schematic view of control logic for a digital signal processor.

Referring to FIG. 15H, the velocity control loop 2000 is a PID loop that takes a commanded speed and measured speed as inputs and provides a commanded torque as an output. The velocity control loop 2000 is enhanced by rate limiting the input command and adding an integrator anti-windup, an integrator decay and an integrator limiting measure. The rate of change of the input command to the loop 2000 is limited such that a step input is changed to a ramped input, allowing for more gentle control. A maximum speed allowed is also limited. The integrator anti-windup measure stops integration of an error when the control is saturated. Integration is stopped when an issued command is larger than a maximum command allowed by the torque loop 1000 or when the torque loop 1000 reports that a PWM command has been limited. The integrator decay measure (not shown) allows the integrator to gracefully decay to zero with a zero velocity command. The integrator decay measure is configurable from a CAN Object Dictionary (OD). If the input command is zero for more than a set number of control cycles, the integrator decay is set to a value less then one. If the commanded input is non-zero, the integrator decay measure is set to 1.0. This allows stiff control while moving, but relaxes the integrator while not commanding any speed. In one example, the integrator decay is the value of the current integrator value multiplied by each control loop iteration. If the integrator decay is 1.0, the integrator decay stays the same. If the integrator decay is 0.99, the value of the integrator slowly fades, unless it is integrating a non-zero error. The integrator limiting measure (not shown) limits minimum and maximum values sent to the integrator.

Exclusive OR logic in the programmable logic circuit 522 protects output signals from having high level conditions at the same time for the high and low site MOSFETs. The programmable logic circuit 522 may, for example, take configuration data as follows: Motor type: brushed or brushless; Motor: enable or disable; Hall sensor: 60° or 120°; Fault clear; DC/DC-PWR Over current: enable or disable; and Direction: clockwise or counter-clockwise.

In some implementations, a health monitor 518 receives data associated with the motor 530 and/or motor controller 510 components. If these components are not functioning properly, the health monitor 518 sends a signal to the programmable logic circuit 522 to cease sending the PWM signal to the DC/DC converter 524 and shuts off power to the motor 530.

Figure 16A:
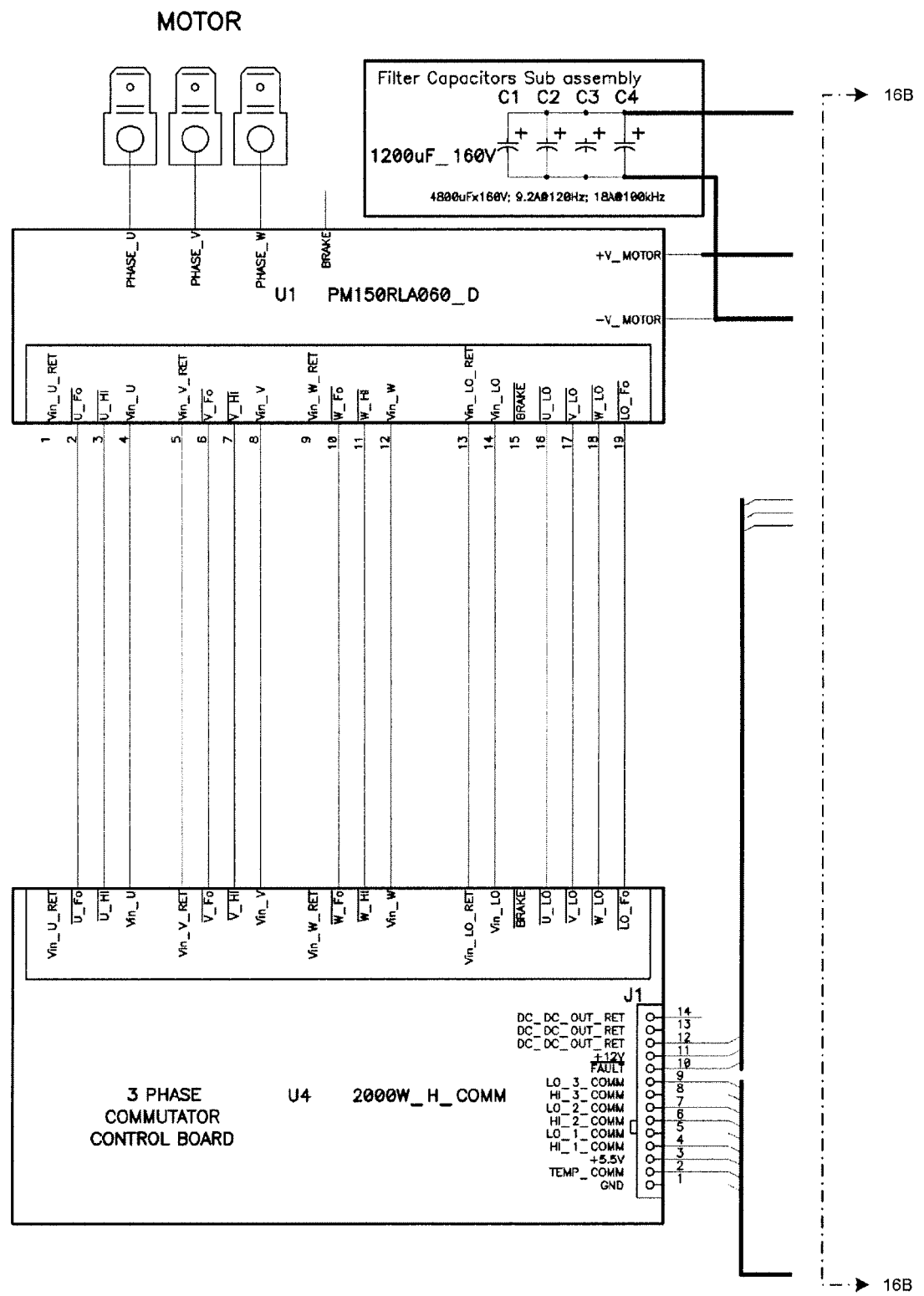
FIGS. 16A-16C together provide a schematic view of a drive module.
Figure 16B:
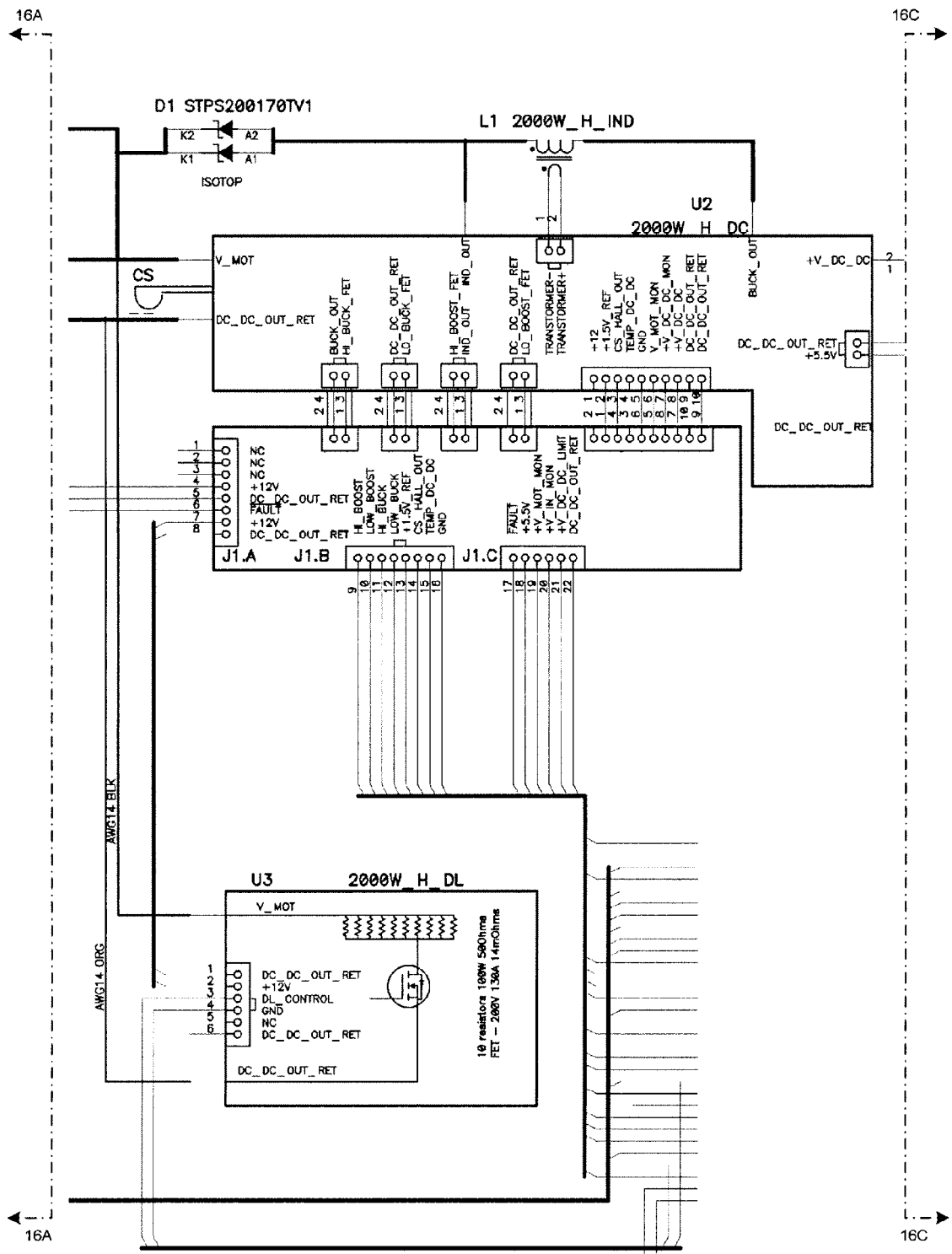
Figure 16C:
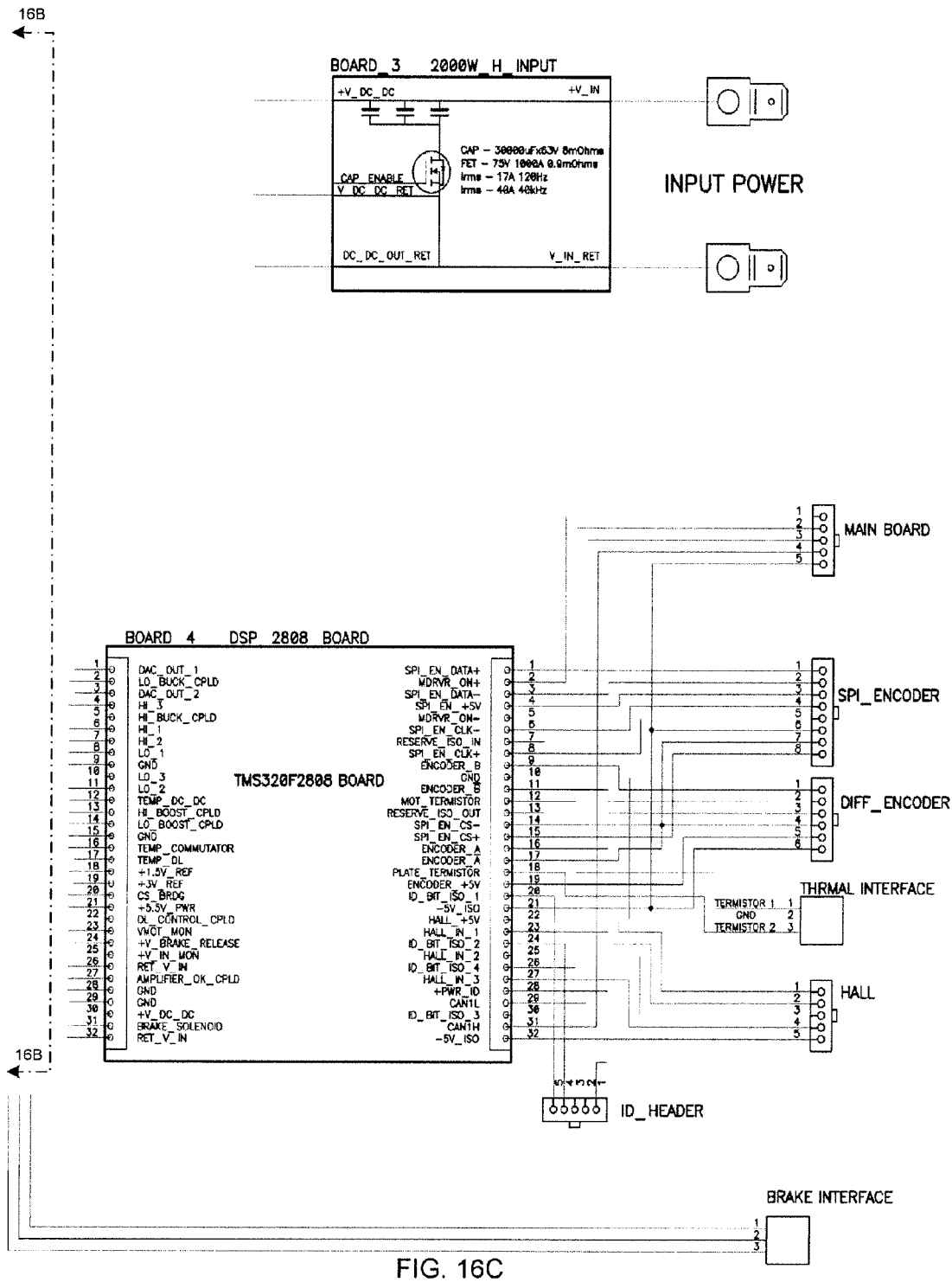
Figure 17:
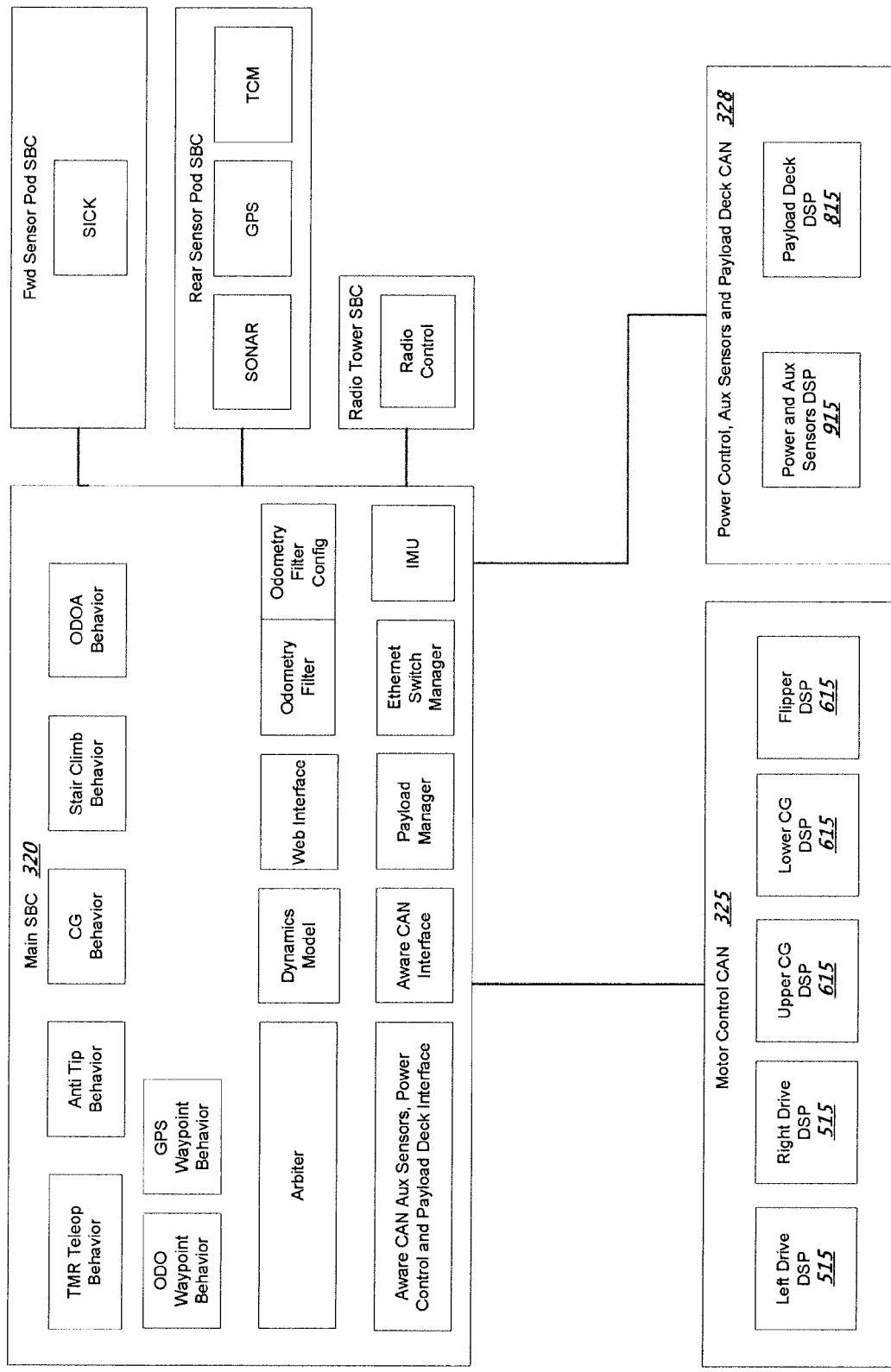
FIG. 17 is a schematic view of control logic.

FIGS. 16A-16C together provide a schematic diagram of one implementation of a drive control module 500. In some examples, the signal processor 515 and/or programmable logic circuit 522 may be accessed by the robot controller 320 to perform other types of processing besides motor control and amplification. For example, the signal processor 515, programmable logic circuit 522, and/or and another processor device, such as a field programmable gate array (FPGA) may be used by the robot controller 320 to perform specialized logic processing associated with relatively large vector arrays, floating point computations, or other requirements, as needed to control the robotic vehicle 10.

In one example, the drive modules 500 have a maximum operating power of about 2000 W and the actuator modules 600 have a maximum operating power of about 500 W. In each module, 500 and 600, the signal processor, 515 and 615, and the amplifier commutator, 520 and 620, are mounted on a single plate, which is located in close proximity to the motor, 530 and 630, to minimize noise, reduce cabling, and provide a compact module, aiding modularity and interchangeability.

In another aspect, a method of controlling a robotic vehicle 10 includes providing a robotic vehicle 10 that includes a chassis 20 having front and rear ends, an electric power source 90 supported by the chassis 20, and a drive assembly, 30 and 40, supporting the chassis 20, and driven by a drive control module 500 as described above. The method also includes providing a robot controller 320 with a power management control logic 411 that recognizes a power source type and monitors an available power level. The robot controller 320 communicates over a controller area network (CAN) bus 325 to the signal processors 515 of each drive control module 500 to deliver drive commands based on the power source type and the available power level. If the power management control logic 410 detects a low power level or high power source temperature, the robot controller 320 will avoid sending power intensive commands to the drive control modules 500 and the actuator modules 600.

Referring to FIG. 12, the robot controller 320 communicates over a power—auxiliary sensors—payload deck CAN bus 328 to a power and auxiliary sensors signal processor 915 (preferably a digital signal processor (DSP)) and a payload deck signal processor 815 (preferably a digital signal processor (DSP)). The power and auxiliary sensors signal processor 915 monitors any auxiliary sensors as well as the power source type, temperature, and available power level for each power source 90 connected to the signal processor 915. The payload deck signal processor 815 monitors the power source type, temperature, and available power level for each power source 90 connected to the payload deck 80. When multiple power sources 90 are installed on the robotic vehicle 10 (i.e. on the chassis 20 and/or the payload deck 80), the power management control logic 410 detects via the auxiliary sensors signal processor 915 and the payload deck signal processor 815 the power source type, temperature, and available power level for each power source 90. The auxiliary sensors signal processor 915 and the payload deck signal processor 815 each control recharging of an associated power source 90 based on power source type, temperature, and available power level for each power source 90.

Figure 18:
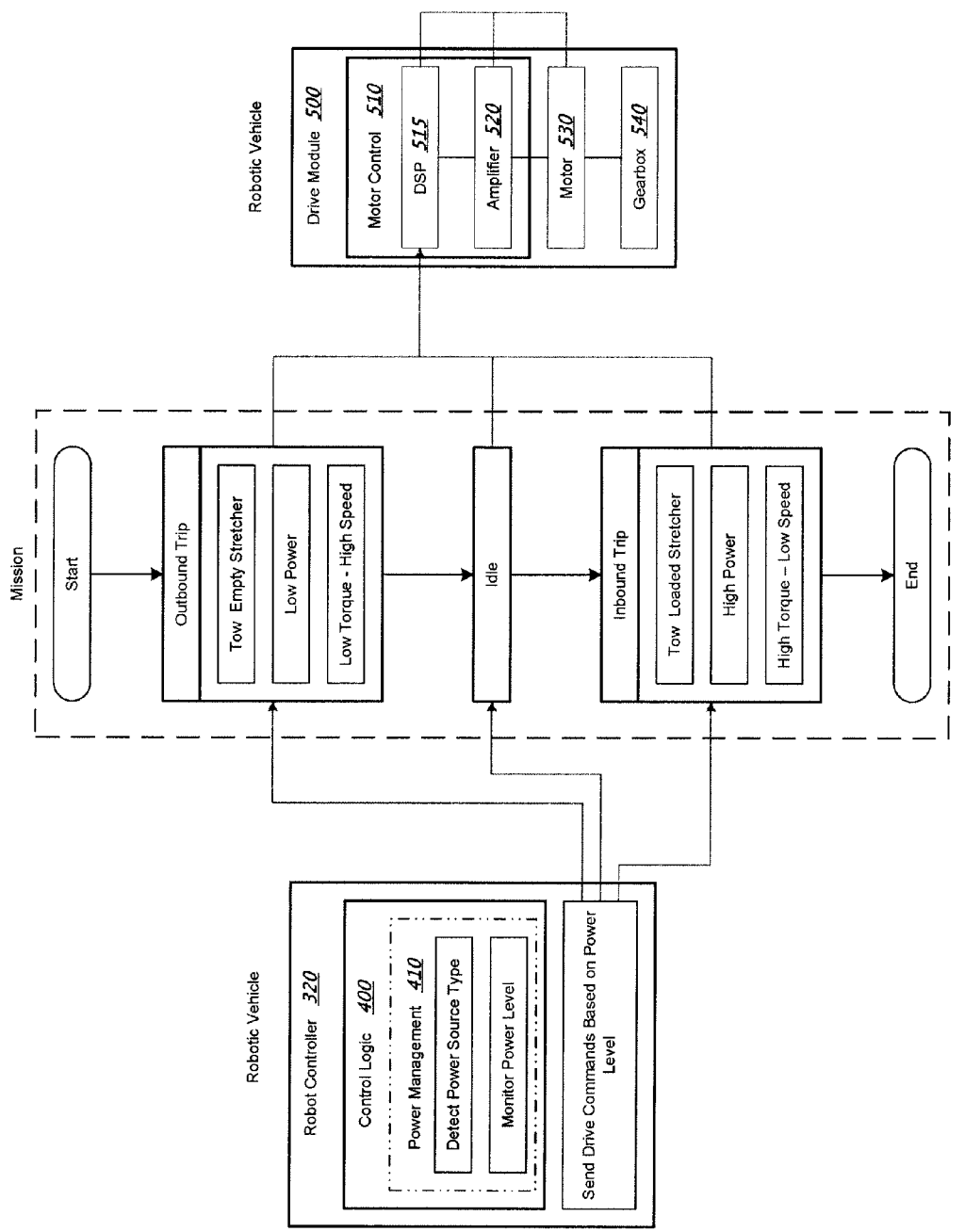
FIG. 18 is a schematic view of a robotic vehicle mission.

FIG. 18 provides a diagram of an example robotic vehicle mission. The robotic vehicle 10, starting from an idle state, must tow a stretcher out to a field location, wait while a casualty is loaded onto the stretcher, and then tow the stretcher and casualty back to either a second location or back to a stating location. For both the outbound and inbound trips, the robot controller 320 sends drive commands to the drive modules 500 based on an available power level, determined by the power management logic 410 in the control logic 400 of the robot controller 320. For the outbound trip, the robot controller 320 sends a drive command for low-torque and high speed to quickly drive out with the empty stretcher. For the inbound trip, the robot controller 320 sends a drive command for high-torque and low speed to slowly drive back with the load stretcher. The ability of the amplifier commutator 520 to deliver a dynamic power range of both amplified and reduced power to the drive motor 530 with a fixed gear ratio gear box 540 allows the robotic vehicle 10 to drive quickly or slowly with low torque or high torque.

Other robotic vehicle details and features combinable with those described herein may be found in a U.S. Provisioned filed on Oct. 6, 2006, entitled "MANEUVERING ROBOTIC VEHICLES" and assigned Ser. No. 60/828,611, the entire contents of which are hereby incorporated by reference.

A number of implementations have been described. Nevertheless, it will be understood that various modifications may be made without departing from the spirit and scope of the disclosure. Accordingly, other implementations are within the scope of the following claims.

What is claimed is:

1. A robotic vehicle comprising:
a chassis having front and rear ends;
an electric power source supported by the chassis; and
multiple drive assemblies supporting the chassis, each drive assembly comprising:
a track trained about a corresponding drive wheel; and
a drive control module comprising:
a drive control housing;
a drive motor carried by the drive control housing and operable to drive the track; and
a drive motor controller in communication with the drive motor and comprising:
a signal processor; and
an amplifier commutator in communication with the drive motor and the signal processor and capable of delivering both amplified and reduced power to the drive motor from the power source;
wherein the amplifier commutator comprises:
a commutator in communication with the drive motor;
a DC/DC converter capable of delivering both amplified and reduced power to the commutator; and
a programmable logic circuit in communication with the signal processor, DC/DC converter, and commutator.

2. The robotic vehicle of claim 1 wherein the drive control module further comprises a back-drivable gearbox coupling the motor to the track.

3. A robotic vehicle comprising:
a chassis having front and rear ends;
an electric power source supported by the chassis; and
multiple drive assemblies supporting the chassis, each drive assembly comprising:
a track trained about a corresponding drive wheel; and
a drive control module comprising:
a drive control housing;
a drive motor carried by the drive control housing and operable to drive the track; and
a drive motor controller in communication with the drive motor and comprising:
a signal processor; and an amplifier commutator in communication with the drive motor and the signal processor and capable of delivering both amplified and reduced power to the drive motor from the power source;
wherein the drive motor controller further comprises a health monitor capable of monitoring the proper functioning of the signal processor and the amplifier commutator, the health monitor capable of sending a signal to the amplifier commutator to cease operation of the motor upon detecting a malfunction.

4. The robotic vehicle of claim 1 wherein each drive control module communicates with a robot controller over a controller area network bus.

5. The robotic vehicle of claim 1 wherein the drive control module further comprises:
multiple magnetic field sensors mounted radially about to the motor, the magnetic field sensors detecting magnetic pulses;
a velocity sensor connected to the motor; and
a rotary position sensor connected to the motor.

6. The robotic vehicle of claim 5 wherein the signal processor comprises logic for three cascading control loops comprising motor current, motor voltage, and motor rotor rotation.

7. The robotic vehicle of claim 6 wherein the current control loop of the signal processor comprises:
reading a current feedback from the commutator;
reading the magnetic field sensors;
computing a pulse-width modulation output;
writing the pulse-width modulation output to a shared structure accessible by the other control loops; and
updating a cycle counter.

8. The robotic vehicle of claim 6 wherein the voltage control loop of the signal processor comprises:
reading a velocity feedback from the velocity sensor;
reading a voltage feedback from the DC/DC converter;
computing a commanded current based on a current limit, maximum current from a thermal protection model, and a current rate of change limit; and
writing the commanded current to a shared structure accessible by the other control loops.

9. The robotic vehicle of claim 6 wherein the motor rotor rotation control loop of the signal processor comprises:
reading a rotational position feedback from the rotary position sensor;
computing a commanded velocity based on current and velocity limits; and
writing the commanded velocity to a shared structure accessible by the other control loops.

10. The robotic vehicle of claim 1 wherein the DC/DC converter receives about 42 V from the power source and is capable of delivering between about 0 V and about 150 V.

11. The robotic vehicle of claim 1 wherein the power source comprises three 14 V batteries in series and three 14 V batteries in parallel, providing about 42 V.

12. The robotic vehicle of claim 1 wherein the drive control module is separately and independently removable from a receptacle of the chassis as a complete unit.

13. The robotic vehicle of claim 12 wherein the drive control module is sealed within the receptacle of the chassis from an outside environment and passively cooled by the chassis.

14. A robotic vehicle comprising:
a chassis having front and rear ends and supported on right and left driven drive tracks, each drive track trained about a corresponding front wheel rotatable about a front wheel axis;
right and left elongated flippers disposed on corresponding sides of the chassis and operable to pivot about the front wheel axis of the chassis, each flipper having a driven flipper track;
a flipper actuator module supported by the chassis and operable to rotate the flippers;
at least one drive module supported by the chassis and operably connected to drive at least one of the drive and flipper tracks;
a payload deck configured to support a payload; and
a linkage connecting the payload deck to the chassis, the linkage having a first end rotatably connected to the chassis at a first pivot, and a second end rotatably connected to the deck at a second pivot, the first and second pivots including respective linkage actuator modules operable to rotatably position their corresponding pivots to control orientation of the payload deck with respect to the chassis;
wherein the track drive modules and actuator modules each comprise:
a module housing;
a motor supported by the module housing;
a back-drivable gearbox supported by the module housing and coupled to the motor; and
a motor controller supported by the module housing and in communication with the motor;
wherein the linkage actuator modules are each separately and independently removable as complete units; and
wherein the track drive modules and the flipper actuator module are each separately and independently removable from respective receptacles of the chassis as complete units.

15. The robotic vehicle of claim 14 wherein the actuator modules are each interchangeable.

16. The robotic vehicle of claim 14 wherein the track drive modules are each interchangeable.

17. The robotic vehicle of claim 14 wherein the track drive modules and the flipper actuator module are each sealed within respective receptacles of the chassis from an outside environment and passively cooled by the chassis.

18. The robotic vehicle of claim 14 wherein the track drive modules and actuator modules each communicate with a robot controller over a controller area network bus.

19. The robotic vehicle of claim 14 wherein the actuator modules further comprise a slip clutch supported by the module housing and coupled to a planetary gearbox.

20. The robotic vehicle of claim 14 wherein the motor of the actuator module provides magnetic braking inhibiting actuation upon power loss.

21. The robotic vehicle of claim 14 wherein the motor controller comprises:
a signal processor; and
an amplifier commutator in communication with the drive motor and the signal processor and capable of delivering both amplified and reduced power to the drive motor.

22. A robotic vehicle comprising:
a chassis having front and rear ends and supported on right and left driven drive tracks, each drive track trained about a corresponding front wheel rotatable about a front wheel axis;
right and left elongated flippers disposed on corresponding sides of the chassis and operable to pivot about the front wheel axis of the chassis, each flipper having a driven flipper track;
a flipper actuator module supported by the chassis and operable to rotate the flippers;

at least one drive module supported by the chassis and operably connected to drive at least one of the drive and flipper tracks;

a payload deck configured to support a payload; and a linkage connecting the payload deck to the chassis, the linkage having a first end rotatably connected to the chassis at a first pivot, and a second end rotatably connected to the deck at a second pivot, the first and second pivots including respective linkage actuator modules operable to rotatably position their corresponding pivots to control orientation of the payload deck with respect to the chassis;

wherein the track drive modules and actuator modules each comprise:
  a module housing;
  a motor supported by the module housing; and
  a motor controller supported by the module housing and in communication with the motor;

wherein the linkage actuator modules are each separately and independently removable as complete units;

wherein the track drive modules and the flipper actuator module are each separately and independently removable from respective receptacles of the chassis as complete units; and wherein each module further comprises a power connector disposed on an outer surface of the module housing and configured to mate with a corresponding power bus connector to establish an electric power connection to the module.

23. The robotic vehicle of claim 22 wherein each track drive module establishes an electric power connection with the bus power connector within its respective receptacle as the module is placed within the receptacle.

24. A method of controlling a robotic vehicle, the method comprising:
  providing a robotic vehicle comprising:
    a chassis having front and rear ends;
    at least one electric power source supported by the chassis; and
    a drive assembly supporting the chassis and driven by a drive control module, the drive control module comprising:
      a drive control housing;
      a drive motor carried by the drive control housing and operable to drive the drive assembly; and
      a drive motor controller in communication with the drive motor and comprising:
        a signal processor; and
        an amplifier commutator in communication with the drive motor and the signal processor; and
  providing a robot controller with a power management control logic that recognizes a power source type and monitors an available power level, the robot controller communicating drive commands to the signal processors of each drive control module based on the power source type and the available power level.

25. The method of claim 24 wherein the power management control logic monitors a power source temperature.

26. The method of claim 25 wherein the robot controller communicates drive commands to the signal processors of each drive control module based on the power source temperature.

27. The method of claim 24 wherein the signal processor of the drive motor controller checks for regenerative braking, wherein upon regenerative braking, the signal processor checks the available power level of the power source and charges the power source until it detects one of the following: a charged level is attained or regenerative breaking ends.

28. The method of claim 24 wherein robotic vehicle further comprises:
  a payload deck supported by the chassis, the payload deck configured to receive at least one electric power source; and
  a payload deck signal processor supported by the payload deck, the payload deck signal processor recognizing a power source type, monitoring an available power level, and communicating the power source type and available power level of the at least one electric power source to the robot controller.

29. The method of claim 28 wherein the payload deck signal processor communicates with the robot controller over a controller area network bus.

30. The method of claim 28 wherein the robotic vehicle further comprises a linkage connecting the payload deck to the chassis, the linkage having a first end rotatably connected to the chassis at a first pivot, and a second end rotatably connected to the deck at a second pivot, the first and second pivots including respective linkage actuator modules operable to rotatably position their corresponding pivots to control orientation of the payload deck with respect to the chassis, wherein the actuator modules each comprise:
  an actuator module housing;
  an actuator motor supported by the module housing; and
  an actuator motor controller supported by the module housing and in communication with the actuator motor and comprising:
    a signal processor;
    an amplifier commutator in communication with the actuator motor and the signal processor; and
  a slip clutch supported by the module housing and coupling the actuator motor to the respective pivot.

31. The method of claim 30 wherein the signal processor of the actuator motor controller checks for regenerative impact absorption, wherein upon regenerative impact absorption, the signal processor of the actuator motor controller checks the available power level of the power source and charges the power source until it detects one of the following: a charged level is attained or regenerative impact absorption ends.

32. The method of claim 24 wherein the amplifier commutator is capable of delivering both amplified and reduced power to the drive motor from the power source.

* * * * *